US008231793B2

(12) United States Patent
Hacker et al.

(10) Patent No.: US 8,231,793 B2

(45) Date of Patent: Jul. 31, 2012

(54) COMBINATION FILTER ARRANGEMENT AND METHOD

(75) Inventors: John R. Hacker, Minneapolis, MN (US); Bradley S. Honermann, Prior Lake, MN (US); Mark S. Emery, Minneapolis, MA (US)

(73) Assignee: Donaldson Company, Inc., Minneapolis, MN (US)

( * ) Notice: Subject to any disclaimer, the term of this patent is extended or adjusted under 35 U.S.C. 154(b) by 84 days.

(21) Appl. No.: 12/864,369

(22) PCT Filed: Jan. 22, 2009

(86) PCT No.: PCT/US2009/031677

§ 371 (c)(1),
(2), (4) Date: Nov. 5, 2010

(87) PCT Pub. No.: WO2009/094437

PCT Pub. Date: Jul. 30, 2009

(65) Prior Publication Data

US 2011/0042329 A1 Feb. 24, 2011

Related U.S. Application Data

(60) Provisional application No. 61/023,296, filed on Jan. 24, 2008.

(51) Int. Cl.

| | |
|---|---|
| ***B01D 37/00*** | (2006.01) |
| ***B01D 29/58*** | (2006.01) |
| ***B01D 35/147*** | (2006.01) |
| ***B01D 35/153*** | (2006.01) |
| ***B01D 35/02*** | (2006.01) |

(52) U.S. Cl. ........ 210/767; 210/790; 210/805; 210/806; 210/186; 210/232; 210/248; 210/323.2; 210/416.5; 210/433.1; 210/434; 210/443; 210/457; 210/136; 210/167.04; 210/167.05; 210/167.06; 123/196 A; 184/6.24

(58) Field of Classification Search ........................ None
See application file for complete search history.

(56) References Cited

U.S. PATENT DOCUMENTS

| | | | | |
|---|---|---|---|---|
| 3,390,778 | A | 7/1968 | Uhen | |
| 4,832,836 | A | 5/1989 | Selsdon | |
| 5,378,363 | A | 1/1995 | Christophe et al. | |
| 2008/0135469 | A1 | 6/2008 | Fremont et al. | |
| 2011/0042329 | A1 * | 2/2011 | Hacker et al. | 210/806 |

FOREIGN PATENT DOCUMENTS

| | | |
|---|---|---|
| DE | 37 24 805 | 12/1988 |
| EP | 1 932 574 | 6/2008 |
| GB | 1 604 834 | 12/1981 |

* cited by examiner

*Primary Examiner* — Robert James Popovics

(74) *Attorney, Agent, or Firm* — Merchant & Gould P.C.

(57) ABSTRACT

A cartridge type filter is mounted in a housing and is serviced through the top of the housing. The cartridge includes first and second media packs axially stacked. The second media pack is in series behind the first media pack, and filters a portion of the liquid therethrough. The second media pack has a higher efficiency than the first media pack. The overall design has a drain system which allows liquid to drain from the interior of the filter housing and back to the sump before the filter cartridge is completely removed from the housing. Other optional features include an oil cooler, various valving, and a filter cartridge lockout mechanism.

15 Claims, 18 Drawing Sheets

COMBINATION FILTER ARRANGEMENT AND METHOD

This application is being filed on 23 Jul. 2010, as a US National Stage of PCT International Patent application No. PCT/US2009/031677, filed 22 Jan. 2009 in the name of Donaldson Company, Inc., a U.S. national corporation, applicant for the designation of all countries except the US, and John R. Hacker, Bradley S. Honermann, and Mark Emery, all citizens of the U.S., applicants for the designation of the US only, and claims priority to U.S. Provisional patent application Ser. No. 61/023,296, filed Jan. 24, 2008 and which applications are incorporated herein by reference. To the extent appropriate, a claim of priority is made to each of the above disclosed applications.

TECHNICAL FIELD

This disclosure relates to filtration. In particular, this disclosure relates to filtration of fluid, such as oil or other lubricant for use with, for example, internal combustion engines.

BACKGROUND

Internal combustion engines use various types of filters in order to reduce overall engine component wear. In particular, a filter is used to remove much of the contaminant found in engine oil or created as part of engine operation. On certain diesel engines, two oil filters are used to improve the effectiveness of the filter on removing contaminant.

FIG. 1 shows a prior art system. In FIG. 1, a first filter 200 is located in the system such that the majority of the oil used to lubricate the moving parts passes through it. A second oil filter 202 is located just upstream of this first filter 200. The second oil filter 202 allows the remaining amount of oil to flow through it and directly into the engine oil reservoir (sump) 204. The second filter 202 is more efficient than the first filter 200, which also means that it is more restrictive to oil flow and acts to continuously clean the oil in the reservoir 204. The net effect is obtaining a higher cleanliness level in the oil without the impact of a high pressure drop across the first filter 200.

In certain prior art systems, the approach of FIG. 1 requires two separate filters 200, 202 installed in their own individual housings. This can be inconvenient, occupy too much space, and cause excessive use of housing materials. In these prior art systems, the second filter 202 is in parallel with the first filter 200 and is exposed to the same level of contaminant as the first filter 200. Further, these filters are often a part of a spin-on filter design. Improvements are desirable.

SUMMARY

A filter cartridge assembly is provided including a first media pack and a second media pack. A center endcap is between the first media pack and the second media pack; the center endcap has a wall defining a bore. The first media pack is secured to the center endcap, and the second media pack is secured to the center endcap. The wall of the center endcap defines a slot arrangement, which provides communication between the bore and a region outside of the center endcap.

In another aspect, a filter assembly is provided including a filter cartridge, as characterized above, a base assembly, and a cover. The base assembly includes a base housing defining an interior. The filter cartridge is operably and removably mounted in the interior of the base housing. The cover is removably oriented on the base housing. The cover is selectively removable to allow access to the interior of the base housing and access to the removable filter cartridge.

In another aspect, a method of filtering liquid is provided. One example method includes directing a first stream of liquid through a first filter media pack to remove particulate from the first stream; after removing particulate from the first stream by the first filter media pack, directing some of the volume of the first stream through a filtered liquid port to downstream components and directing the remaining portion of the volume through a second filter media pack to remove particulate and provide a second stream; the second media pack being part of a same cartridge as the first media pack; and after removing particulate from the remaining portion through the second filter media pack, directing the second stream to a liquid sump.

In another aspect, a method of servicing a filter assembly is provided. The method includes providing a filter assembly, as characterized above; removing the cover from the base housing; removing the filter cartridge from the base housing; operably installing a new filter cartridge as characterized above in the base housing; and putting the cover onto the base housing.

Example overall designs may optionally include a drain system that allows liquid to drain from the interior of the filter housing and back to the sump before the filter cartridge is completely removed from the housing. Other optional features include an oil cooler, various valving, and a filter cartridge lock-out mechanism.

Not all the features described herein must be incorporated in an arrangement for the arrangement to have some selected advantage, according to the present disclosure.

DETAILED DESCRIPTION

Figure 1:
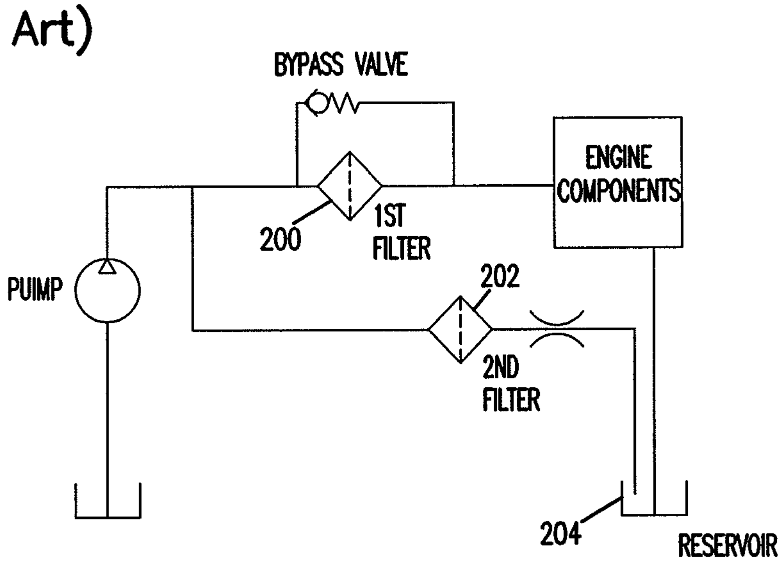
FIG. 1 is a schematic view of a prior art filter system.

In one aspect, an improvement to the prior art system of FIG. 1 is to locate the second, more efficient filter downstream of the first filter, rather than in parallel with the first filter. This way, the second filter will be exposed to fewer and smaller contaminant particles, extending the life of the second filter. Only a small amount of additional media is needed in the first filter to compensate for the small increase in flow through the first filter that was normally going through the first filter. In another aspect, another improvement to the FIG. 1 design is to provide a bowl-cartridge assembly, rather than utilizing the spin-on filter cartridge design. Utilizing the bowl-cartridge assembly will eliminate the need to dispose of the spin-on housing each time the filter is serviced. In a bowl-cartridge assembly, only the cartridge is replaced. There are additional, separate, and independent improvements in the design as characterized herein.

Figure 2:
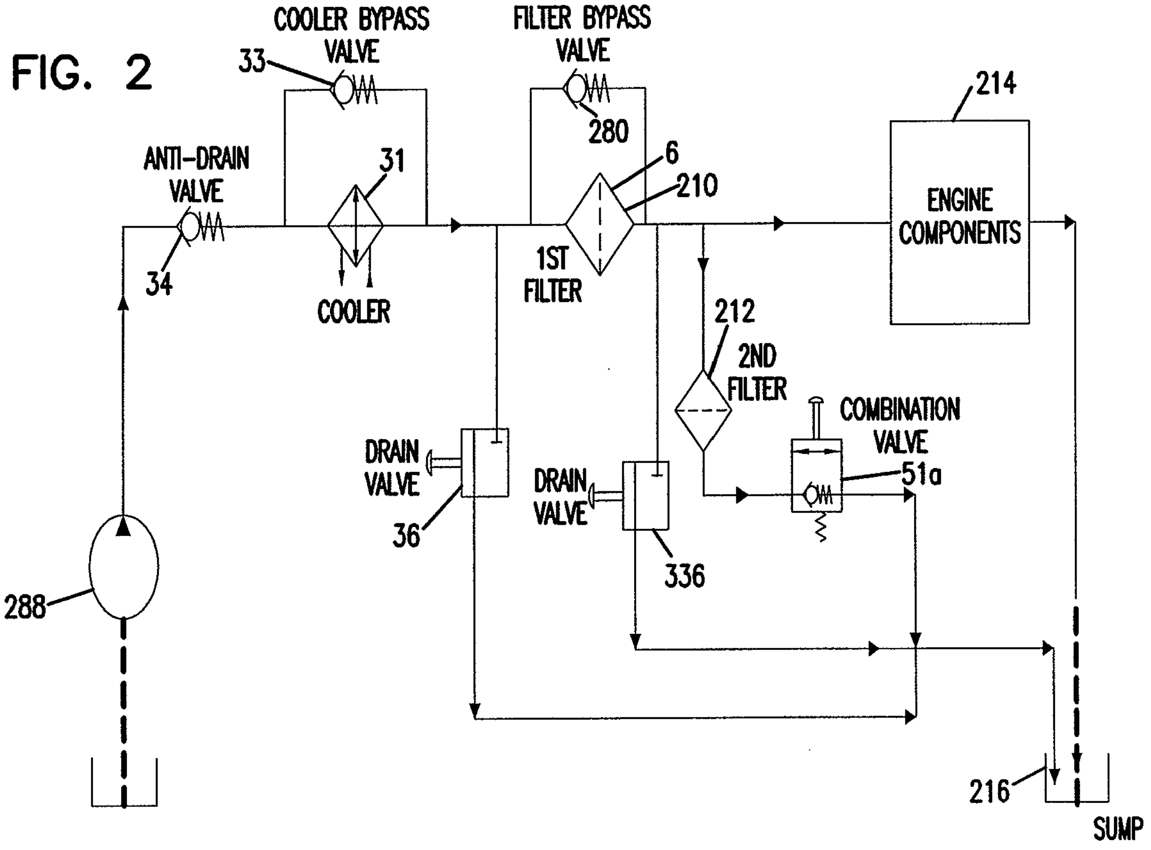
FIG. 2 is a schematic view of a filter system constructed in accordance with principles of this disclosure.

In FIG. 2, an improved system in accordance with principles of this disclosure is shown. For purposes of clarity, not all of the reference numerals are shown in every figure. In FIG. 2, a first filter is illustrated schematically at 210, while a second filter 212 is provided in serial, rather than in parallel, to the first filter 210. As can be seen in the system of FIG. 2, after fluid, such as oil, flows through the first filter 210, a portion of it flows to downstream engine components 214, while a remaining portion flows through the second filter 212. The portion that flows through the second portion 212 is returned to the engine sump 216.

Figure 3:
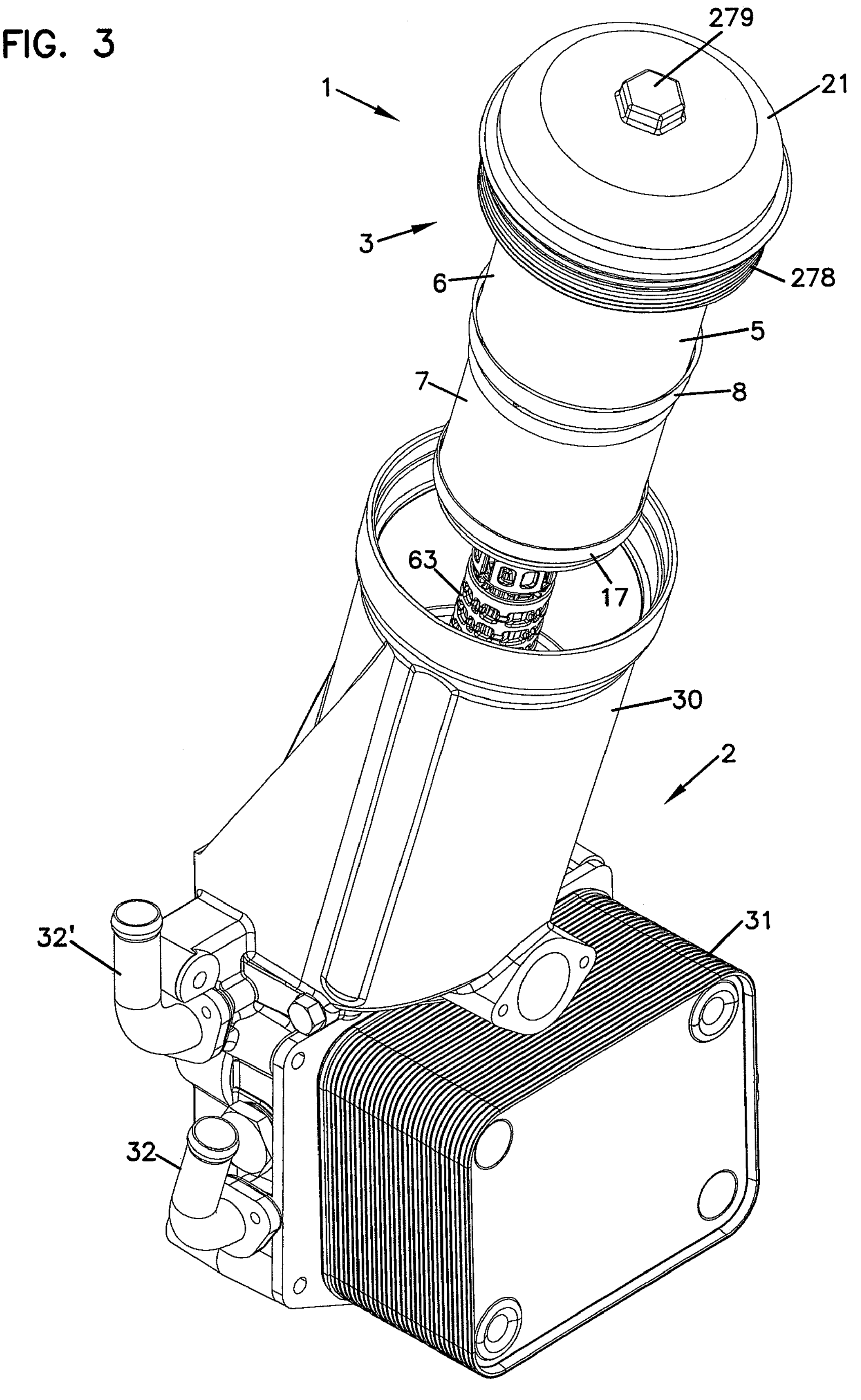
FIG. 3 is an exploded, perspective view of a filter assembly constructed in accordance with principles of this disclosure.
Figure 4:
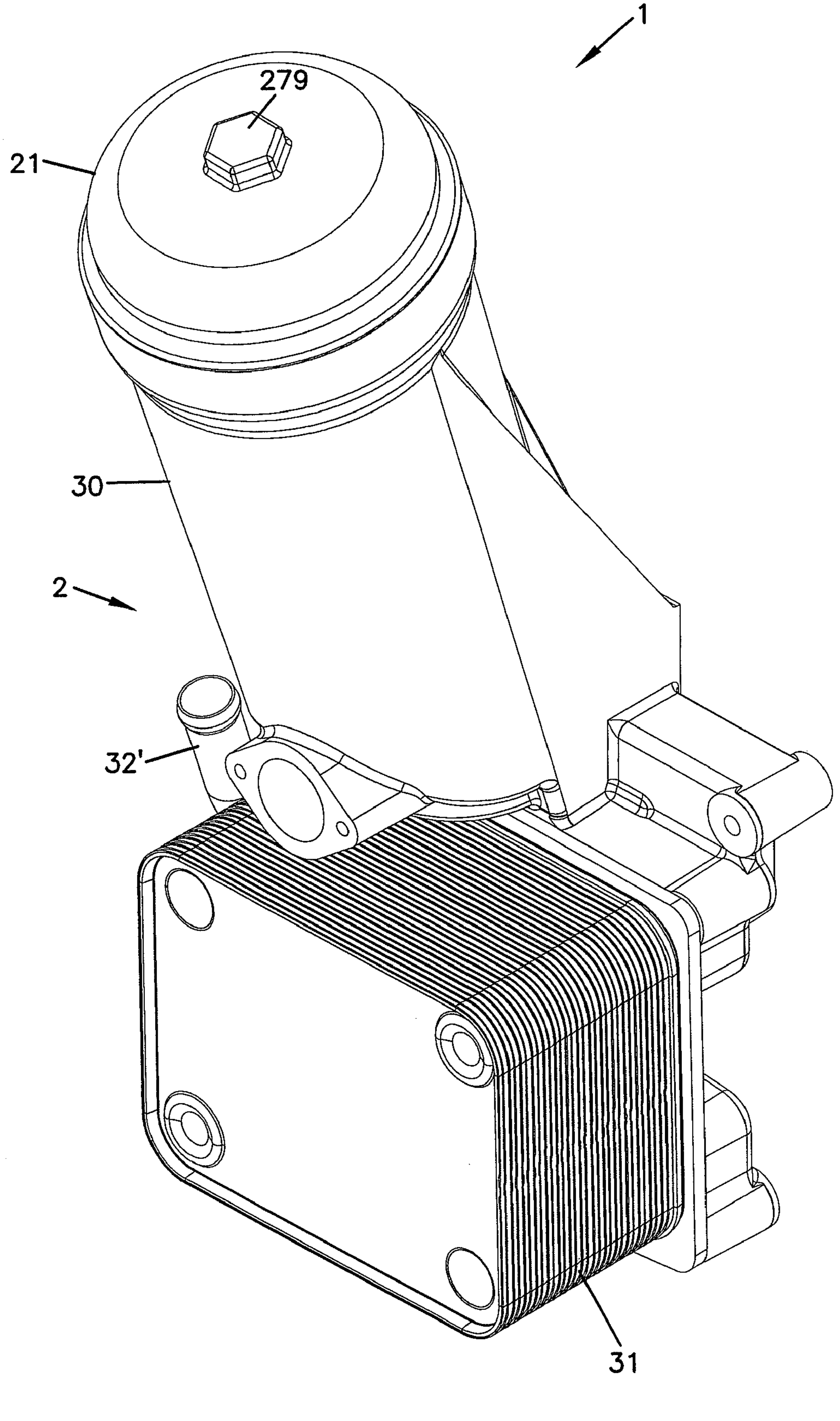
FIG. 4 is a perspective view of the filter assembly of FIG. 3, assembled for operative use.

Attention is directed to FIGS. 3 and 4, which illustrate one embodiment of a filter assembly 1 constructed in accordance with principles of this disclosure. In the embodiment shown, the filter assembly 1 includes a base assembly 2 and a cover/cartridge assembly 3. The cover/cartridge assembly 3 is removable from the filter assembly 1 during servicing. The cover/cartridge assembly 3 includes a cover 21 and a filter cartridge assembly 5. The filter cartridge assembly 5 is replaced during servicing.

Figure 5:
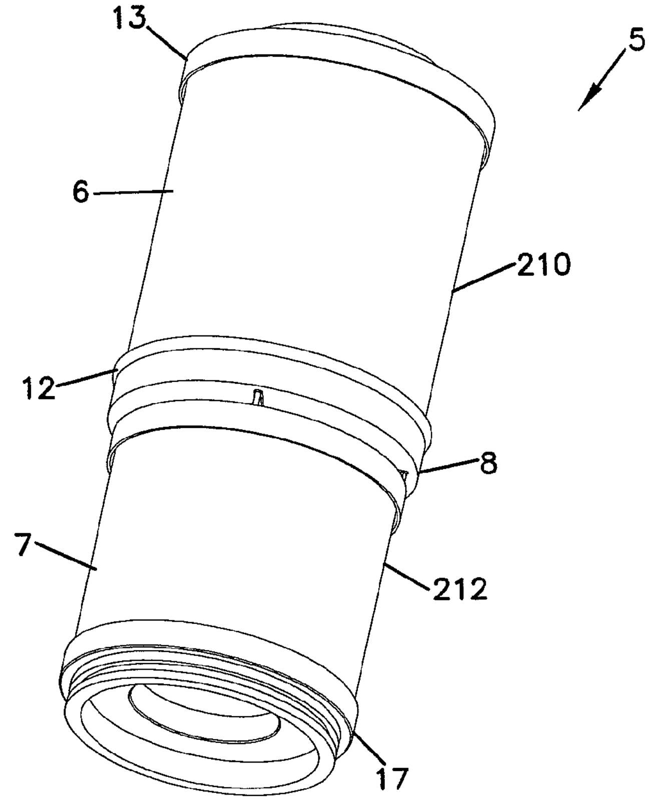
FIG. 5 is a perspective view of a filter cartridge usable in the filter assembly of FIGS. 3 and 4.
Figure 6:
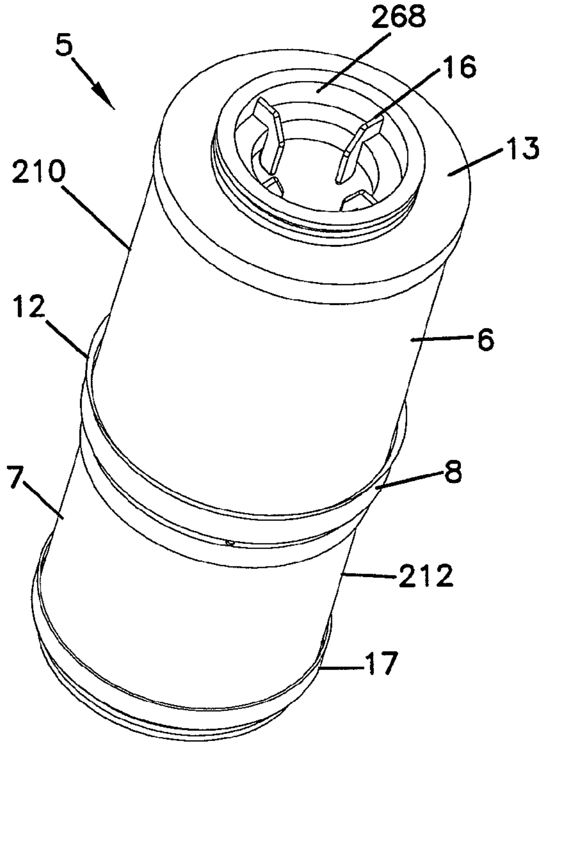
FIG. 6 is another perspective view of the filter cartridge of FIG. 5.
Figure 14:
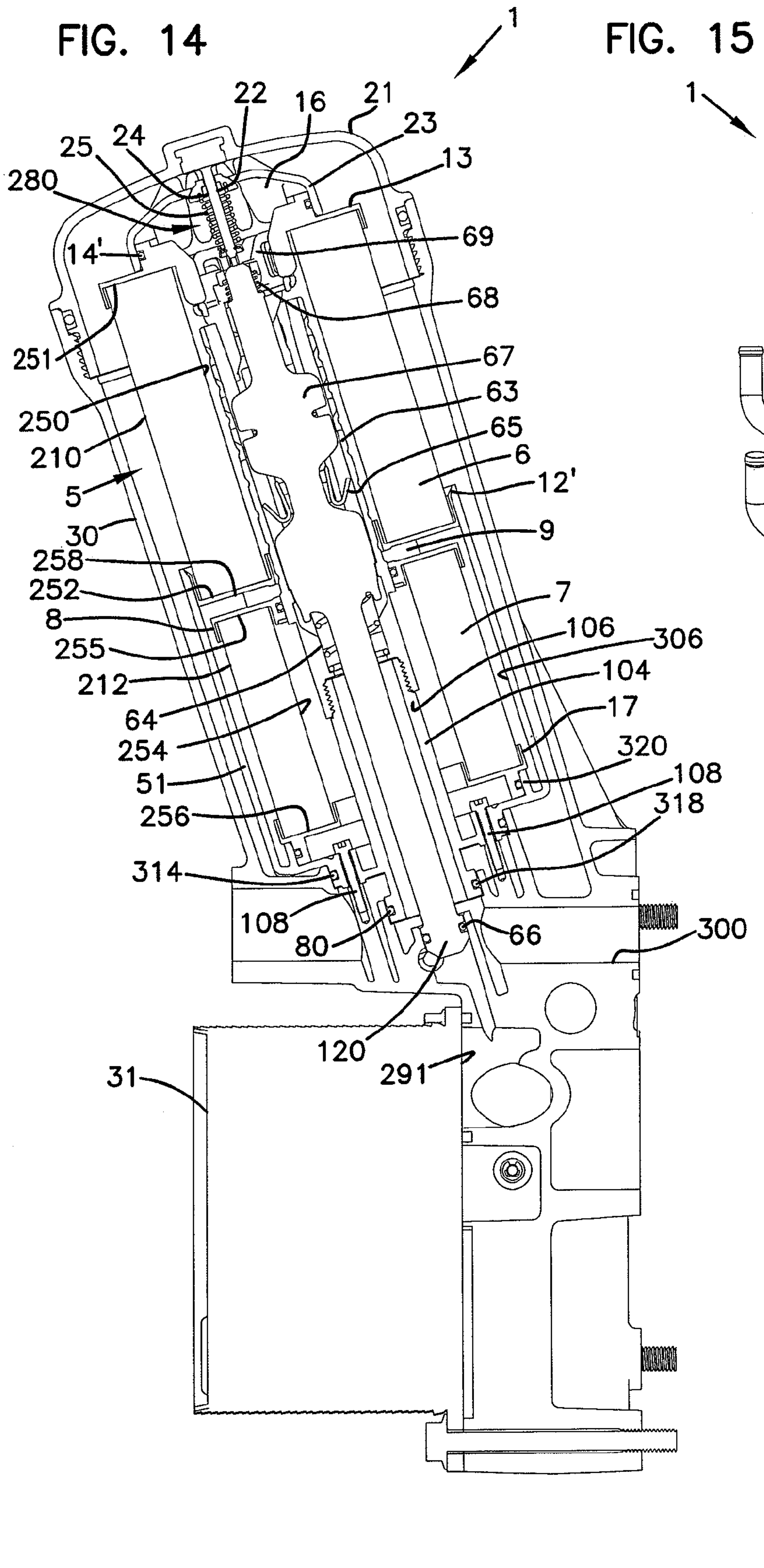
FIG. 14 is a cross-sectional view of the filter assembly of FIG. 4, the cross-section being taken along the line 14-14 of FIG. 15.
Figure 15:
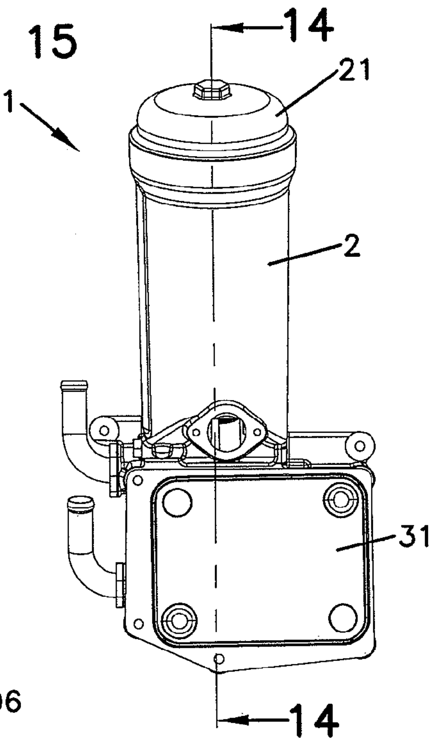
FIG. 15 is a side-elevational view of the filter assembly of FIG. 4.
Figure 17:
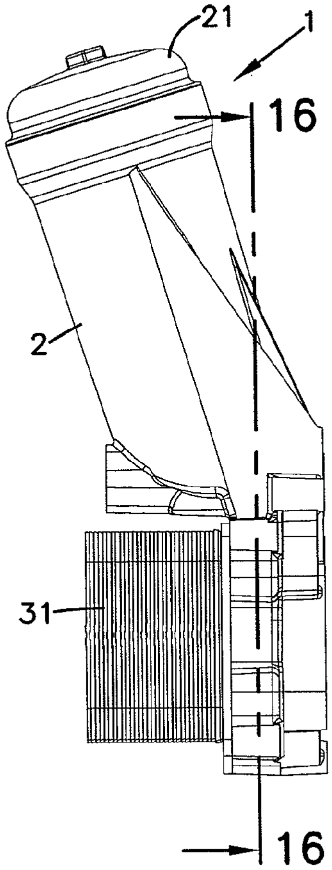
FIG. 17 is a side-elevational view of the filter assembly of FIG. 4.

In FIGS. 5 and 6 are further views of the filter cartridge assembly 5. The cartridge assembly 5 includes the first filter 210, which has a first media pack 6, and the second filter 212, which has the second media pack 7. In this particular example, the first media pack 6 and the second media pack 7 are separated by a center endcap 8. In the embodiment shown, the first media pack 6 has a tubular shape and defines a first open interior volume 250 (FIG. 14). The first media pack 6 further has a first end 251 and a second opposite end 252. Preferably, the first media pack 6 is cylindrical in construction and can be made from a variety of types of media including, for example, pleated media, such as pleated cellulose. As can be appreciated from FIGS. 5 and 6, the first filter 210 and the second filter 212 are part of a common, integrally formed filter cartridge 5. That is, the first filter 210 cannot be removed independently of the second filter 212, and vice-versa.

In this example, the second media pack 7 has a tubular shape and defines a second open interior volume 254. The second media pack 7 has first and second opposite ends 255, 256. In the embodiment shown, the second media pack 7 is also preferably cylindrical. It can be made from a variety of different types of media including, for example, pleated media. As mentioned above, the second media pack 7 will preferably be made from a higher efficient media than the media of the first media pack 6. In the example illustrated, the first and second media packs 6, 7 are optionally co-axially aligned; that is, in this example, they share a common axis. In the embodiment shown, they are stacked one on top of the other. In other embodiments, the first and second media packs 6, 7, can be arranged differently—for example, arranged in a manner so that they do not share a common axis (i.e., are non co-axially aligned).

In the embodiment shown, the first media pack 6 has a diameter that is greater than the second media pack 7. In typical embodiments, the first media pack 6 will have a media pack that is 2-15% larger than the second media pack 7. Also, in the embodiment shown, the first media pack 6 has an overall axial length that is greater than the second media pack 7. Typical embodiments will include the first media pack 6 being from 2-20% longer than the second media pack 7. The media 6, 7 will typically be pleated paper. The efficiency of the media pack 7 can be more than the efficiency of the media pack 6. For example, the efficiency of the media pack 7 can be from 2-10 micron, while the efficiency of the media pack 6 can be 15-30 micron. In some examples, the media pack 7 will be at least 150% more efficient than the media pack 6.

Figure 7:
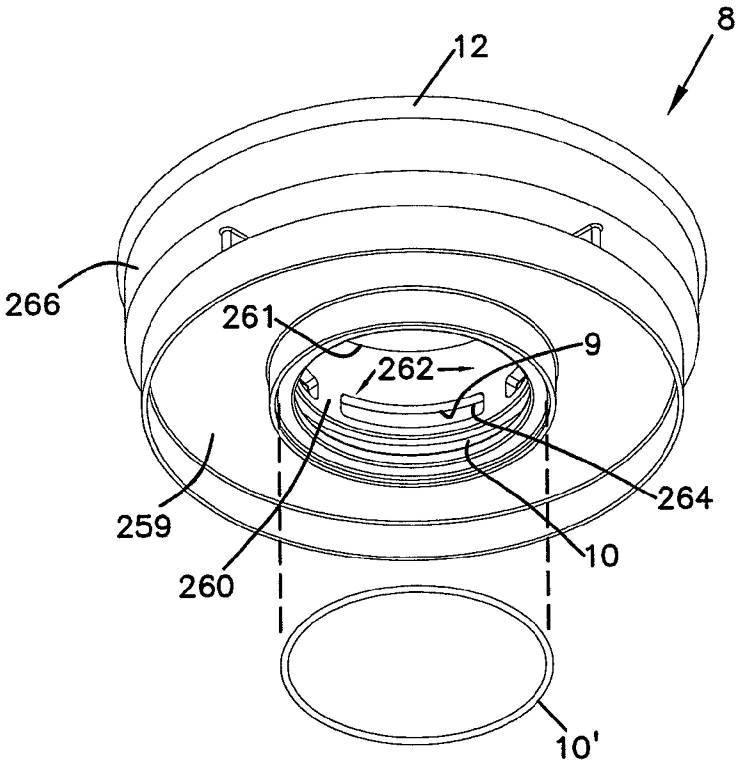
FIG. 7 is an exploded, perspective view of an endcap usable in the filter cartridge of FIGS. 5 and 6.

The center endcap 8 can be between the first media pack 6 and the second media pack 7. In FIG. 7, the center endcap 8 has a first side 258 (FIG. 14), an opposite second side 259, and a tubular wall 260 extending between the first and second sides 258, 259.

The first media pack second end 252 is, in the embodiment shown, secured to the center endcap first side 258. In the embodiment shown, the second media pack first end 255 is secured to the center endcap second side 259. This way, through the center endcap 8, the first media pack 6 and second media pack 7 are secured, or attached, or connected to each other at their respective axial ends. The tubular wall 260 of the center endcap 8 includes a slot arrangement 262. In the embodiment shown, the slot arrangement 262 comprises at least one elongated through slot 264 which functions as a flow passage 9. In this manner, the slot arrangement 262 provides communication between a bore 261 and a region outside the center endcap 8. The bore 261 is defined by the tubular wall 260 and extends between the first side 258 and second side 259.

The center endcap 8 defines an O-ring groove 10 for holding an O-ring seal member 10'. The O-ring groove 10 is defined by the tubular wall 260 and lines the bore 261 axially between the slot arrangement 262 and the center endcap second side 259. The O-ring seal member 10' seals against an inner liner 63 (FIG. 13) when the filter cartridge assembly 5 is operably-installed within the base assembly 2.

Figure 12:
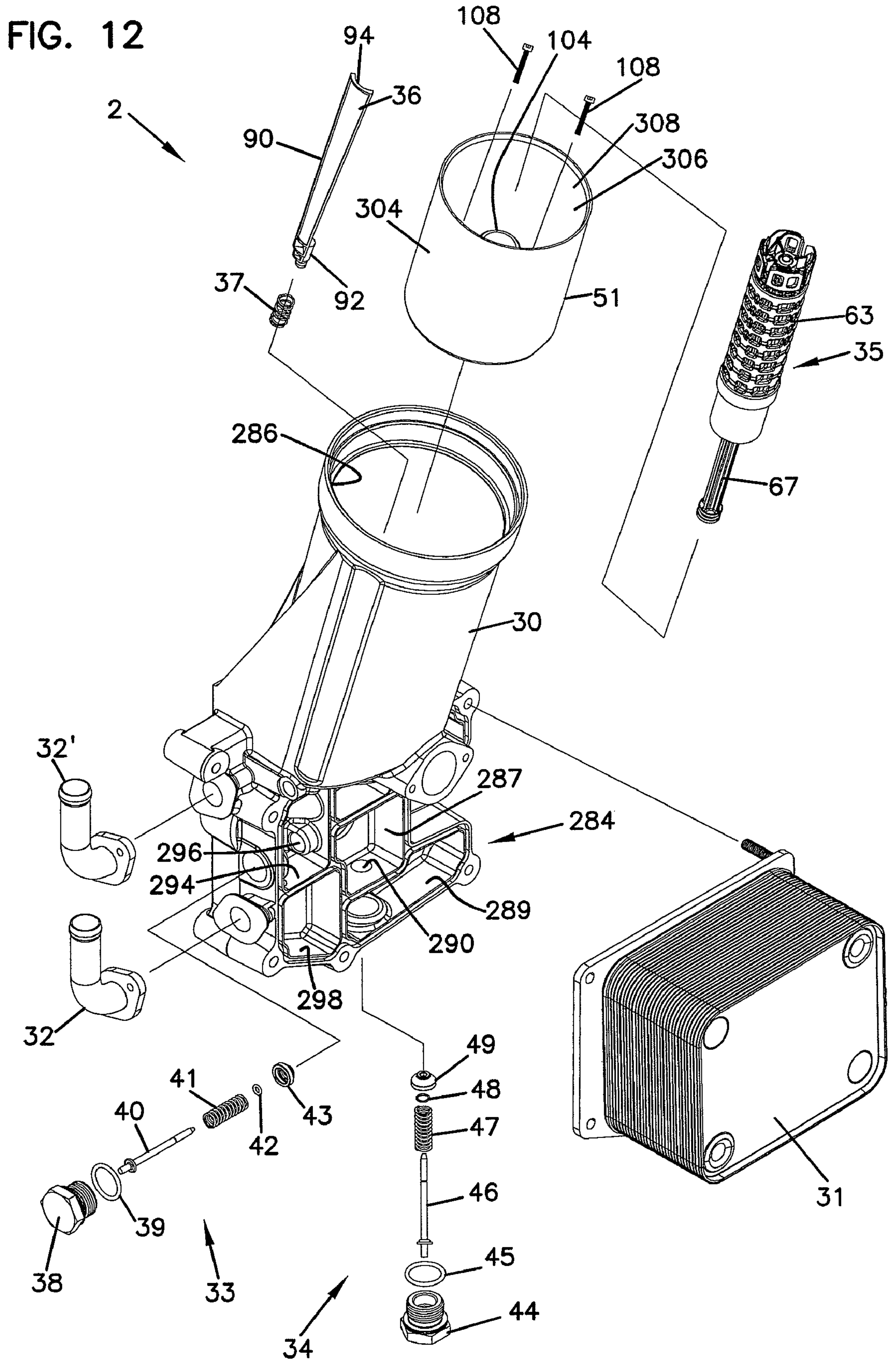
FIG. 12 is an exploded, perspective view of a base assembly constructed in accordance with principles of this disclosure.

In the embodiment shown, the center endcap 8 further includes a lip seal member 12. The lip seal member 12 radially projects from a wall 266 surrounding the center endcap first side 258. When the filter cartridge assembly 5 is operably-installed in the base assembly 2, the lip seal member 12 forms a seal 12' (FIG. 14) with a housing insert 51 (FIG. 12).

Figure 9:
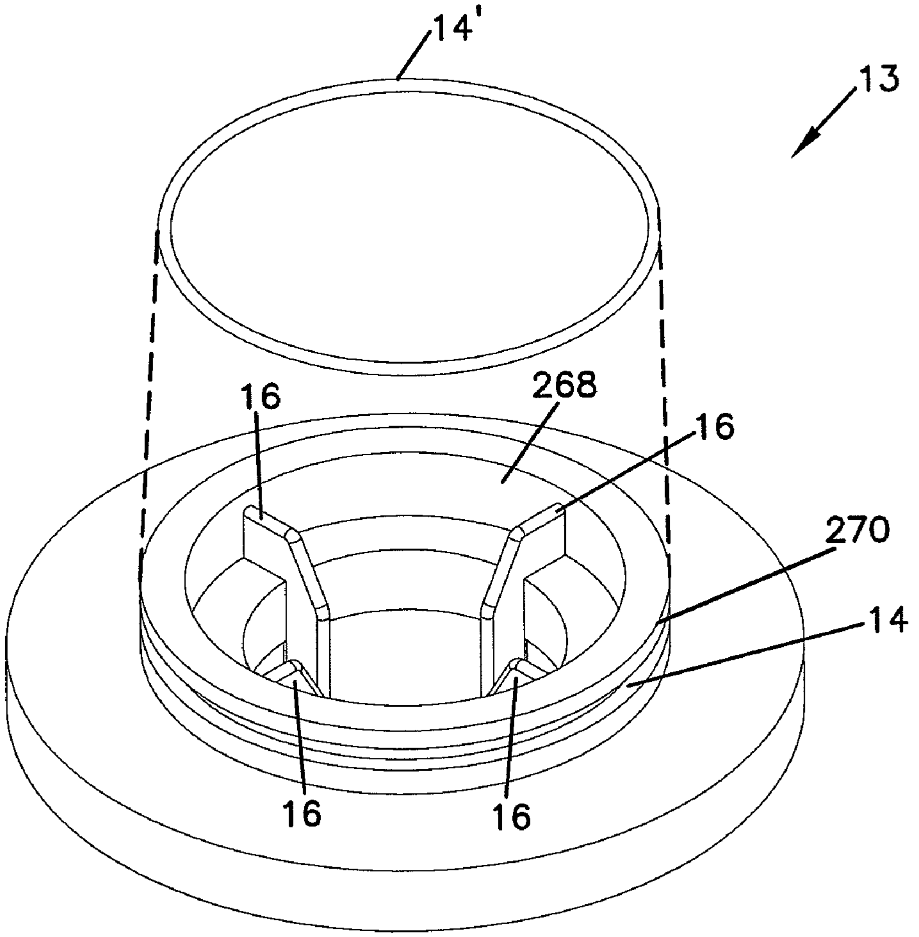
FIG. 9 is an exploded, perspective view of an endcap usable in the filter cartridge of FIGS. 5 and 6.

In reference to FIG. 9, the filter cartridge assembly 5 includes, in this embodiment, a first endcap 13. The first endcap 13 is secured to the first media pack first end 251 and defines an opening 268 in communication with the first open interior volume 250 (FIG. 14). In the embodiment shown, the first endcap 13 includes an axially-extending wall 270 circumscribing the first endcap opening 268. In the embodiment shown, the wall 270 defines a groove 14 for holding an O-ring seal member 14'. The O-ring seal member 14' forms a seal with a valve seat insert 23 (FIG. 10), which is part of the cover/cartridge assembly 3, when the filter cartridge assembly 5 is operably-assembled in the base assembly 2 with the cover 21 operably-mounted in place. In the embodiment shown, the first endcap 13 further includes at least one key tab 16 projecting radially inwardly into the first endcap opening 268. The key tab 16 can be at least one, and in the embodiment shown, is illustrated as including four radially-spaced about the opening 268. The key tab 16 cooperates with a lockout mechanism. The lockout mechanism ensures that the base assembly 2 and the cover 4 are not connectable unless the filter cartridge assembly 5 is operably-installed therein.

Figure 8:
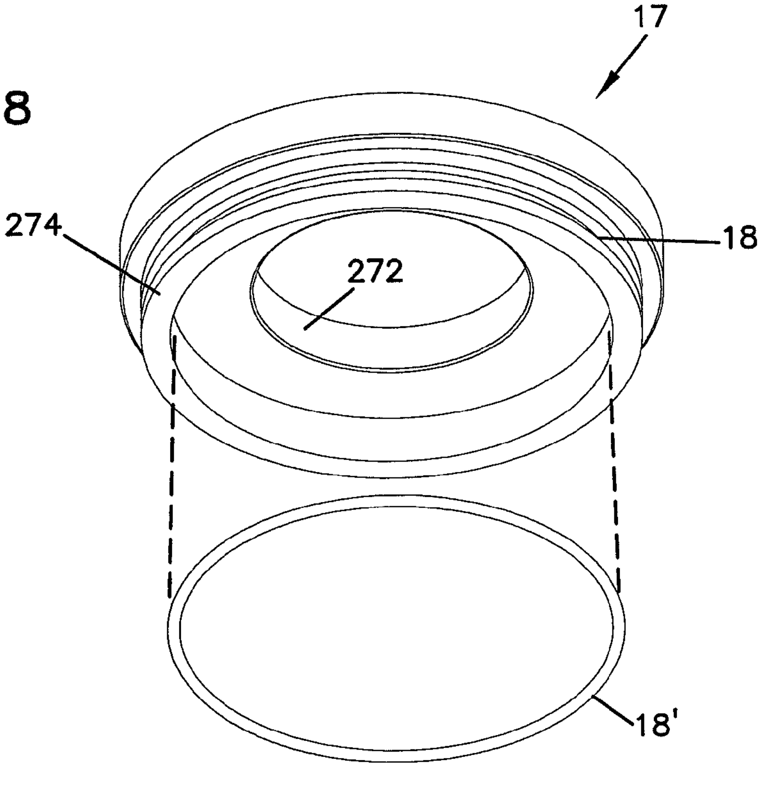
FIG. 8 is an exploded, perspective view of an endcap usable in the filter cartridge of FIGS. 5 and 6.

A second endcap 17 is illustrated as being secured to the second media pack second end 256 (FIG. 14) and defines an opening 272 (FIG. 8) in communication with the second open interior volume 254. The second endcap 17 includes an axially-extending wall 274 circumscribing the second endcap 272. The second endcap wall 274 defines a groove 18 for holding an O-ring seal member 18'. The O-ring seal member 18' forms a seal with the housing insert 51 (FIG. 12), when the filter cartridge assembly 5 is operably-installed within the base assembly 2.

Figure 10:
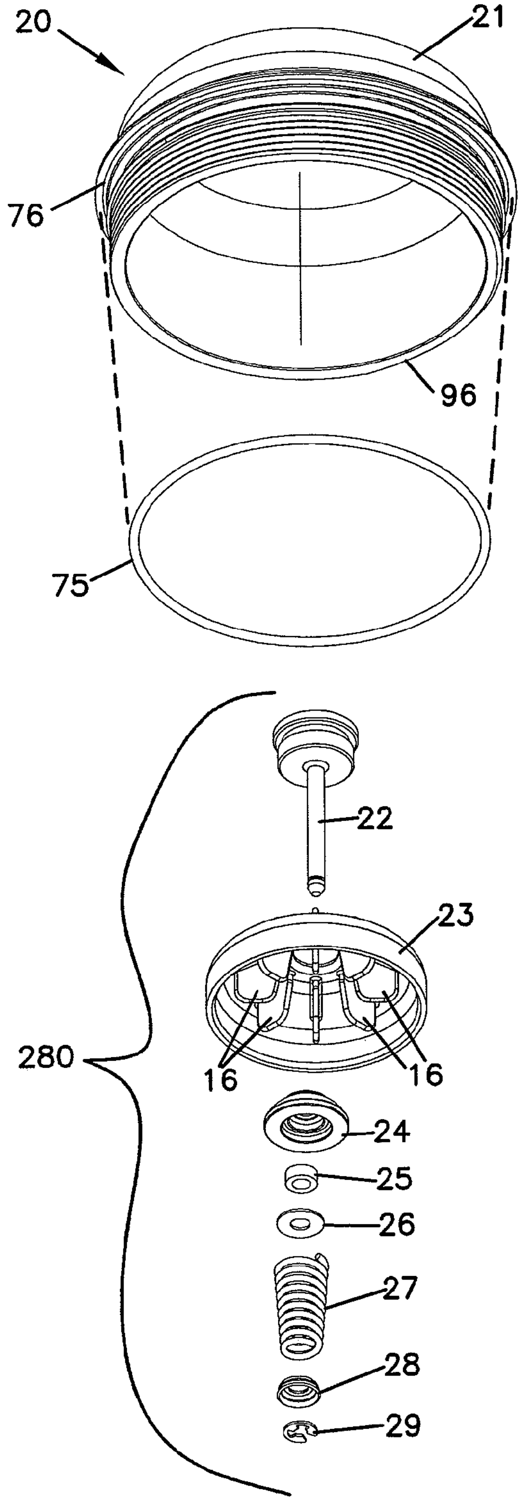
FIG. 10 is an exploded, perspective view of a cover assembly constructed in accordance with principles of this disclosure.
Figure 11:
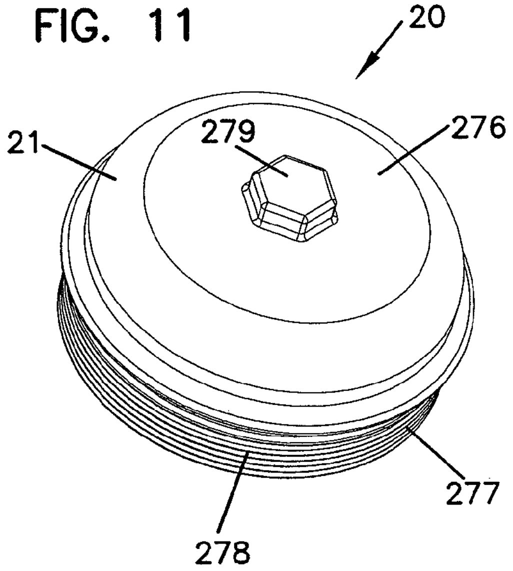
FIG. 11 is a perspective view of the cover depicted in FIG. 10.

Attention is next directed to FIGS. 10 and 11. The cover assembly is illustrated generally at 20. In this embodiment, the cover assembly 20 includes a cover 21, a valve pin 22, a valve seat insert 23, a valve poppet 24, a valve seal 25, a washer 26, a valve spring 27, a pin cup 28, and a snap ring 29. Other embodiments can include different parts to achieve the same function As can be seen, the cover 21, in this example, includes a top 276 and a surrounding side wall 277. The surrounding side wall 277 includes threads 278 to allow the cover 21 to be selectively removably attached to the base assembly 2. A nut 279 is at the top 276 of the cover 21 to assist with securing or unsecuring the cover 21 in place on the base assembly 2. A seal member 75 is held in a groove 76 of the cover 21, to form a seal with the base housing 30.

Figure 28:
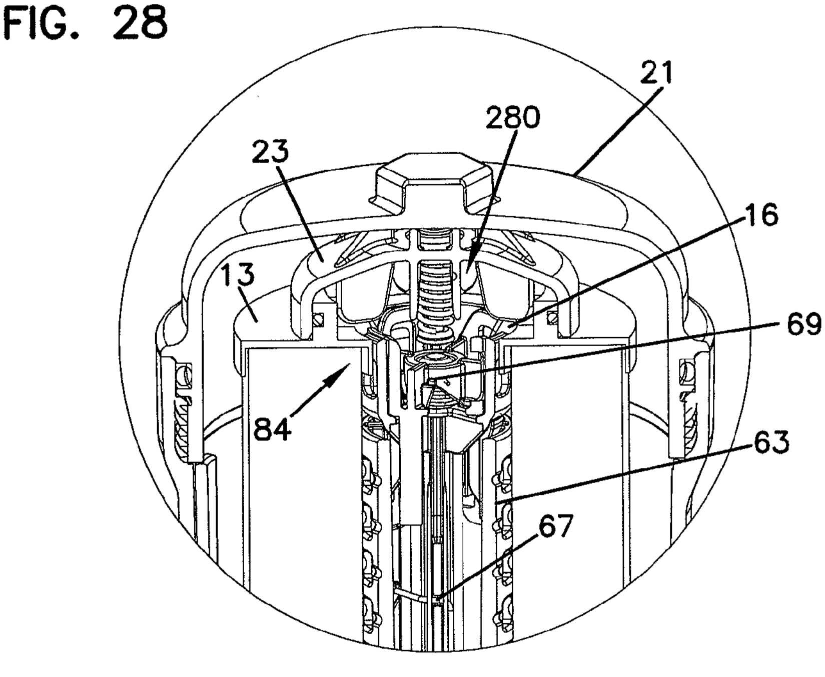
FIG. 28 is an enlarged, perspective, cross-sectional view of a portion of the filter cartridge assembly of FIG. 26.

The valve pin 22, valve seat insert 23, poppet 24, seal 25, washer 26, spring 27, pin cup 28 and snap ring 29 are part of a bypass valve assembly 280. In FIGS. 14 and 28, it can be seen how the bypass valve assembly 280 is operably-installed within the interior of the filter cartridge assembly 5, in use. When there is undue restriction through the first media pack 6 or in the case of a cold-start condition, the poppet 24 can move against the spring 27 and move away from the opening 281 in the valve seat insert 23. This allows for the flow of liquid through the opening 281 and into the interior volume 250.

Attention is next directed to FIG. 12. FIG. 12 shows base assembly 2. In this embodiment, the base assembly 2 includes a base housing 30, a lube cooler or oil cooler 31, and a port assembly 284. The base housing 30 defines an interior 286. The filter cartridge assembly 5 is operably and removably mounted in the interior 286 of the base housing 30. The cover 21 is removably oriented on the base housing 30 and is selectively removable to allow access to the interior 286 to allow access to the removable filter cartridge assembly 5. Other embodiments can include different parts to achieve the same function.

Still in reference to FIG. 12, there is also illustrated two coolant tubes 32, 32'; an oil cooler bypass valve assembly 33; a check valve assembly (or anti-drain valve) 34; a housing insert 51; an inner liner assembly 35; a drain valve 36; and a spring 37.

The bypass valve assembly 33, in this embodiment, includes a plug 38, an O-ring 39, a valve pin 40, a valve spring 41, a O-ring 42, and a valve poppet 43. Other embodiments can include different parts to achieve the same function.

The check valve assembly 34 includes a plug 44, an O-ring 45, a valve pin 46, a valve spring 47, an O-ring 48, and a valve poppet 49. Other embodiments can include different parts to achieve the same function.

Still in reference to FIG. 12, the port assembly 284 defines a plurality of chambers for holding and conveying various fluids including lube (such as oil) and coolant. In the embodiment shown, the port assembly 284 includes a first lube chamber 287 downstream from a lube pump, such as a pump 288 in FIG. 2. A second lube chamber 289 is downstream of the first lube chamber 287 and includes a port 290 connecting the first lube chamber 287 and second lube chamber 289.

The check valve assembly 34 operates as an anti-drain valve and controls flow at the port 290 between the first lube chamber 287 and second lube chamber 289. The second lube chamber 289 is upstream of and in communication with the coolant assembly 31.

The port assembly 284 further includes a lube sump chamber 291 (FIG. 16) that is downstream of the filter cartridge assembly 5 and upstream of the lube sump 216 (FIG. 2). A port 292 can be seen in FIG. 16 that leads from the lube sump chamber 291 to the sump 216.

A cooled lube inlet chamber 294 is downstream of and in communication of the oil cooler 31. The cooled lube inlet chamber 294 is immediately upstream of the filter cartridge assembly 5. As can be seen in FIG. 10, the bypass valve assembly 33 controls flow between the first lube chamber 287 and the cooled lube inlet chamber 294. If, for whatever reason, the flow through the oil cooler 31 is restricted or backed up, fluid pressure can press on the poppet 43 against the spring 41, which will open the port 296 between the first lube chamber 287 and the cooled lube inlet chamber 294, allowing lube or oil to flow from the first lube oil chamber 287 directly to the cooled lube inlet chamber 294, thereby bypassing the oil cooler 31.

The port assembly 284 further includes a first coolant chamber 298 upstream of the oil cooler 31 and in communication with the oil cooler 31. A second coolant chamber 299 is downstream of the oil cooler 31 and is in communication with the oil cooler 31.

Figure 16:
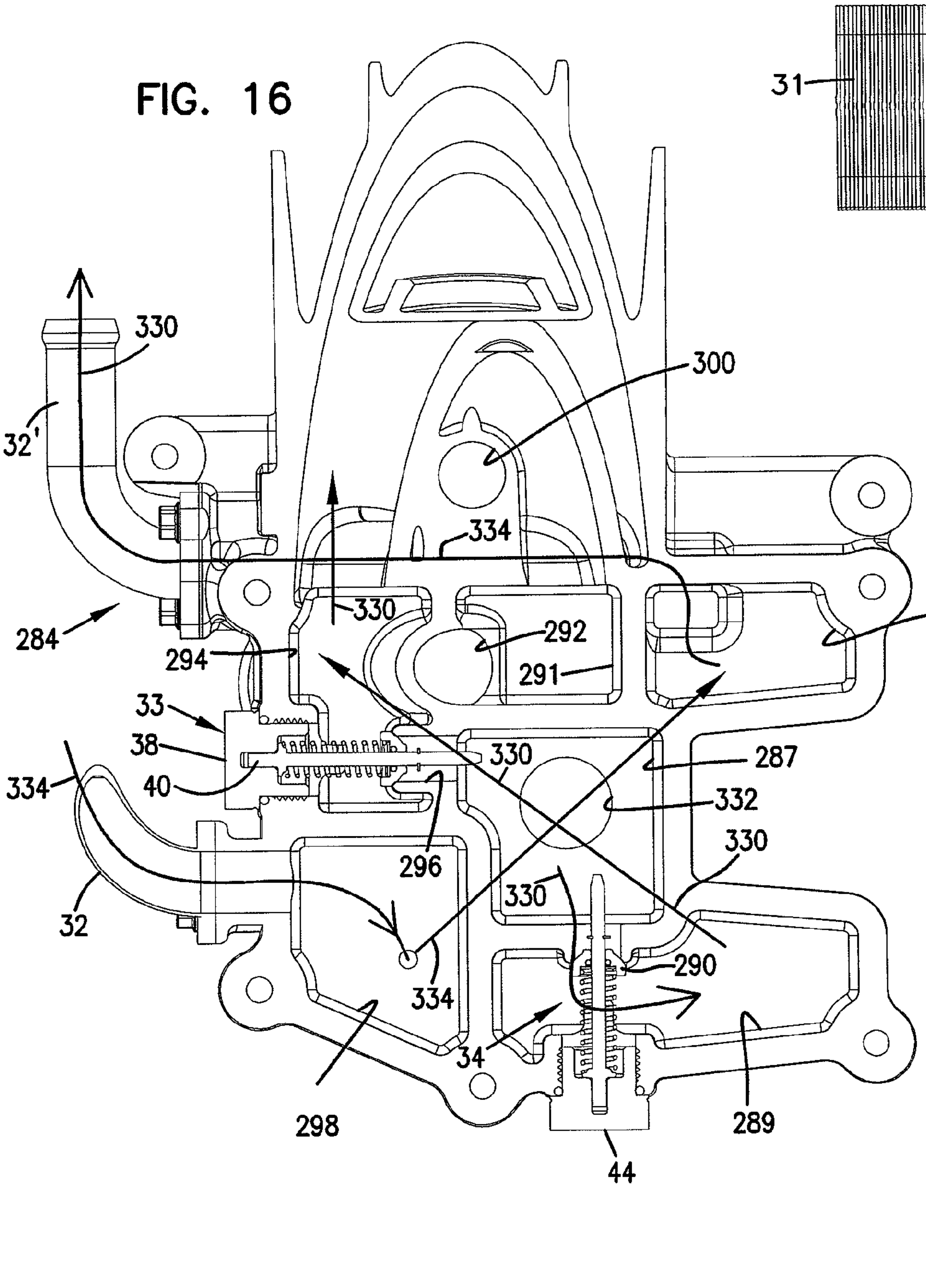
FIG. 16 is a cross-sectional view of a portion of the filter assembly showing flow paths of fluid through a port assembly, which is part of the base assembly, the cross-section being taken along the line 16-16 of FIG. 17.

In FIG. 16, another port that is visible is port 300. Port 300 conveys filter fluid, such as oil, from the clean side of the first media pack 6 to engine components 214 (FIG. 2).

Figure 13:
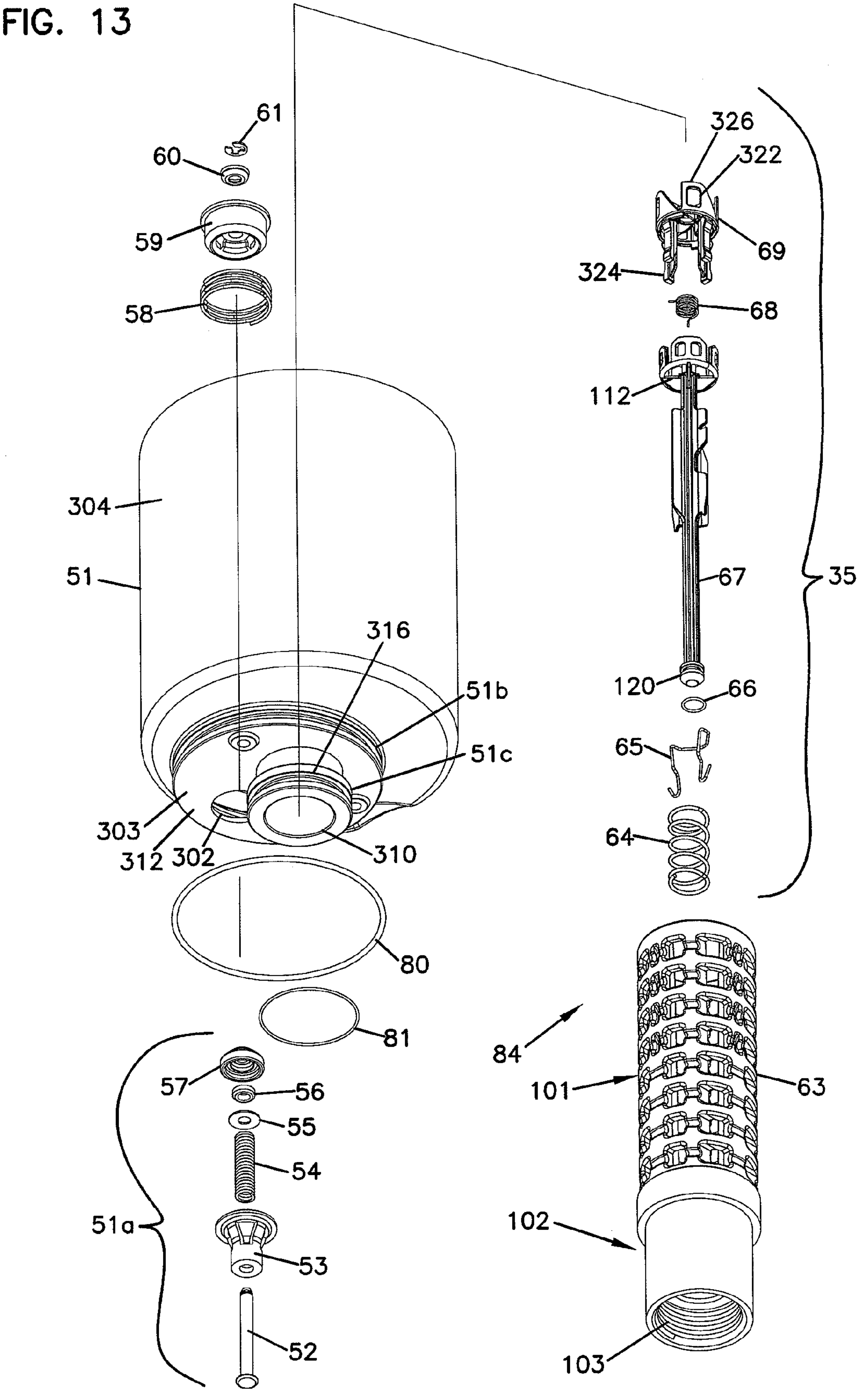
FIG. 13 is an exploded, perspective view of internal components within the base assembly of FIG. 12.

Attention is directed to FIG. 13. In FIG. 13, the housing insert 51, along internal components, is illustrated. A combination valve assembly can be seen at 51*a*. The combination valve assembly 51*a* is oriented within a valve receiving opening 302 of a bottom wall 303 of the insert 51. The combination valve 51*a* controls the amount of fluid being allowed to flow through the second media pack 7 and also prevents fluid to drain back from the base housing 30 when the engine is shut off, such that there is no flow of lube or fluid through the filter assembly 1.

Figure 22:
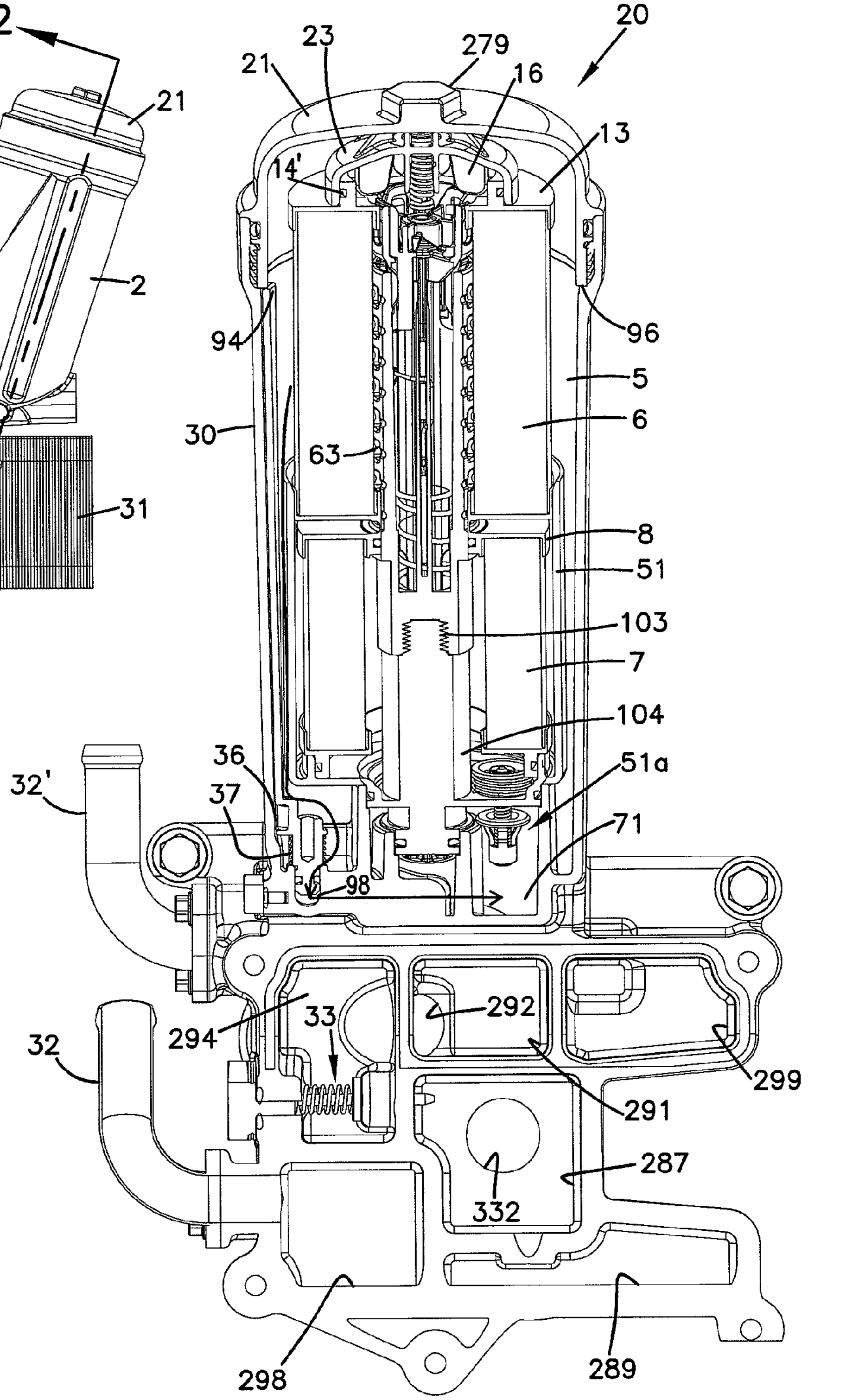
FIG. 22 is a cross-sectional view of the filter assembly showing flow paths therethrough, the cross-section being taken along the line 22-22 of FIG. 23.
Figure 25:
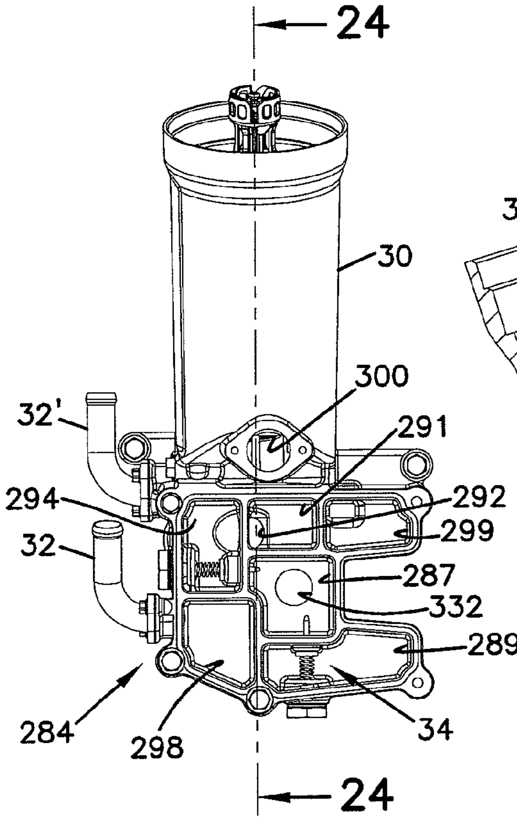
FIG. 25 is a side elevational view of the base assembly with the cover and cartridge assembly removed.

In the embodiment shown, the combination valve assembly 51*a* includes a spring pin 52, a spring retainer 53, a lower spring 54, a disc 55, a seal member 56, a valve poppet 57, an upper spring 58, a valve seat 59, a valve cup 60, and a snap ring 61. FIG. 22 shows the combination valve 51*a* operably-installed within the valve receiving opening 302 in the insert 51, when the filter cartridge assembly 5 is also installed in the base housing 30. Other embodiments can include other parts to achieve the same function.

The housing insert 51 includes an insert surrounding wall 304 defining an insert interior 306 (FIG. 12). An open mouth 308 (FIG. 12) provides access to the interior 306. The insert bottom wall 303 (FIG. 13) is opposite of the mouth 308 and is circumscribed by the insert surrounding wall 304. The insert bottom wall 304 defines a first opening 310 and the valve receiving opening 302. The bottom wall 303 further defines a first plateau 312, which defines the valve receiving opening 302. Surrounding the first plateau 312 is a groove 51*b* for holding a O-ring seal member 80. This O-ring seal member 80 forms a seal 314 (FIG. 14) with the base housing 30.

Extending from the first plateau 312 is a tube 316. The tube 316 defines the first opening 310. The tube 316 defines a groove 51*c* for holding another O-ring seal member 81. The O-ring seal member 81 held by groove 51*c* forms a seal 318 (FIG. 14) with the base housing 30.

As can be seen in FIG. 14, the filter insert 51 includes an inner wall 320. The wall 320 provides a surface for engaging the O-ring seal member 18' that is held by the second endcap 17. It can also be seen in FIG. 14 how the second endcap 17 axially-engages an end point of the wall 320. The wall 320 extends from the bottom wall 300 and is circumscribed by the surrounding wall 304. The wall 320 also circumscribes a wall member 104, which is further described below. The wall 320 is radially spaced from the insert surrounding wall 304 and is also radially spaced from the wall member 104. The wall member 104 is, in addition, longer than the wall 320, and as such, the ends of the respective walls 104, 320 are axially spaced.

Also shown in FIG. 12 are fasteners 108. The fasteners 108 secure the housing insert 51 to the base assembly 2. Fasteners 108 can be seen securing the housing insert 51 to the base assembly 2 in FIG. 14.

Figure 24:
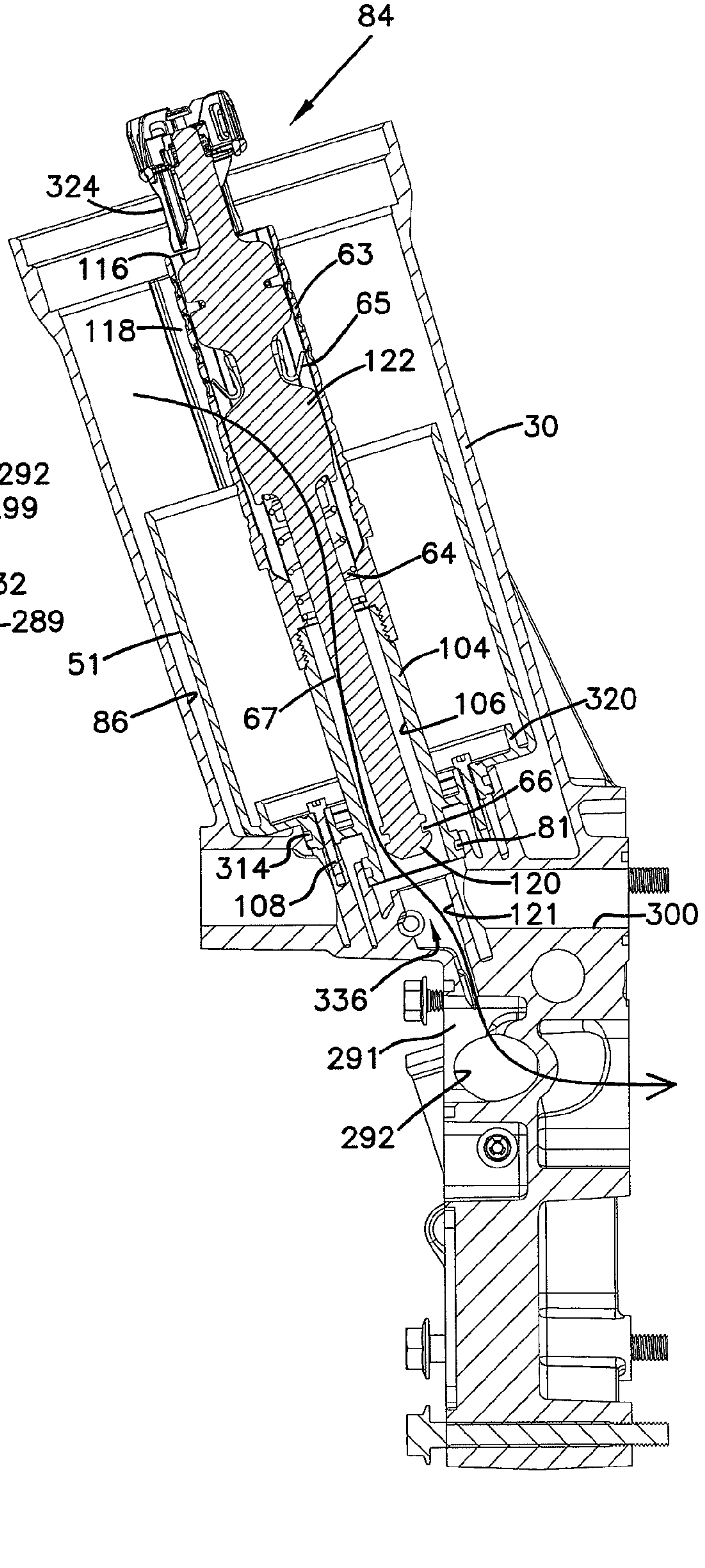
FIG. 24 is a cross-sectional view showing the base assembly with the cover and cartridge assembly removed and depicting drainage, constructed according to principles of this disclosure, the cross-section being taken along the line 24-24 of FIG. 25.

Still in reference to FIG. 13, the inner liner assembly is shown at 35. The inner liner assembly 35, in the embodiment shown, includes an inner liner 63, a compression spring 64, a lock spring 65, an O-ring seal member 66, a post 67, a torsion spring 68, and a basket 69. In this embodiment, a lowermost portion of the post 67 defines a plug 120. The seal member 66 rests on the plug 120 and is used to form a seal within a bore 121 (FIG. 24). The plug 120 and bore 121 form a drain valve 336.

The features of the inner liner assembly 35 can be utilized as part of a filter lockout mechanism 84 to ensure that the base housing 30 and cover 21 are not connectable unless the filter cartridge assembly 5 is operably-installed therein. One implementation of a filter lockout mechanism 84 is described in detail in commonly assigned and co-pending patent application WO 2008/134494 filed Aug. 15, 2007 and published Nov. 6, 2008, the disclosure of which is incorporated by reference herein in its entirety.

In FIG. 14, there is a cross-sectional view of the filter assembly 1. The inner liner assembly 35 can be seen operably-installed within the first open interior volume 250 and second open interior volume 254.

In this embodiment, the basket 69 is snap-fitted to the post 67, and the basket 69 is oriented in its locked position by the bias of the upper torsion spring 68. In particular, the torsion spring 68 is oriented such that it biases the basket 69 into the locked position by rotational force exerted between webs 322 (FIG. 13) and the resistance to that force because of engagement between legs 324 (FIG. 13) and leg receiving apertures 112 (FIG. 13) in the post 67. When the lockout mechanism 84 is in the locked position (FIG. 24), the basket 69 is in its locked position, and each of the legs 324 has its free end in engagement with an engagement end 116 (FIG. 24) of guide rails 118 (FIG. 24) within the inner liner 63. In this position, without the filter cartridge assembly 5 installed in the base housing 30, the tips 326 (FIG. 13) will engage against portions of the cover 21, and the basket 69 and post 67 will not be moveable axially downwardly, which will prevent the threads 278 (FIG. 11) on the cover 21 to engage the threads on the base housing 30.

When the filter cartridge assembly 5 is properly positioned in the base housing 30, the filter lockout mechanism 84 is unlocked. In this embodiment, the unlocking occurs by having the key tabs 16 on the first endcap 13 come in contact with the basket 69. As the filter cartridge assembly 5 moves axially downwardly, the key tabs 16 engage against the basket 69, causing the basket 69 to rotate from its locked position to its unlocked position against the torsion spring 68. As the basket 69 rotates, the legs 324 also rotate moving away from engagement against end 116 (FIG. 24) of guide rails 118 (FIG. 24) in the inner liner 63. When the legs 324 completely clear the guide rails 118, any additional movement of the cartridge assembly 5 in a downwardly axial direction also causes the basket 69 and post 67 to also move in that direction against the compression spring 64. The compression spring 64 biases the basket 69 and the post 67 in an extended position (FIG. 24) by pushing against fins 122 which extend radially from the post 67. Once the filter cartridge assembly 5 has been moved downwardly enough to unlock the post 67 and move the basket 69 from its locked position into its unlocked position, the cover 21 will be able to matably engage threads on the base housing 30 for secure attachment.

The inner liner 63, in this embodiment, includes a porous section 101, which allows the flow of liquid therethrough, and a non-porous section 102. The non-porous section 102, as oriented in FIG. 13, is immediately below the porous section 101. An inner wall of the non-porous section 102 is threaded at threads 103 to permit the inner liner 63 to connect with wall member 104. Wall member 104, in the embodiment shown, is an internal wall within the housing insert 51. A portion of the wall member 104 can be seen in the perspective view of FIG.

12. The wall member 104 is circumscribed by and radially spaced from the surrounding wall 304 and projects from the bottom wall 303 (FIG. 13). The wall member 104 is a hollow, tubular wall to accommodate the post 67 therethrough. Also, the region between the post 67 and an inside surface of the wall member 104 allows for the flow of filtered liquid, after the liquid has been filtered by the first media pack 6. The inside volume of the wall member 104 leads to the tube 316, which defines the first opening 310 (FIG. 13). As mentioned previously, seal member 81 is held in groove 51*c* in the tube 316, to form seal 318 (FIG. 14) with the base housing 30. The seal 318 separates the fluid that has been filtered by the first media pack 6 and which has not been diverted through the flow passage 9—but rather—has flowed in the volume 106 (FIG. 18) which is between the inside of the wall member 104 and the outside of the post 67, from entering the lube sump chamber 91 as this filtered fluid exits the filter assembly 1 through the filtered liquid port 300.

FIG. 16 illustrates a flow path of the liquid, the example herein is a lube such as oil. FIG. 16 also illustrates the flow path of the coolant. The flow path of the oil is shown at reference numeral 330. Oil flows into the first lube chamber 287 through a port 332 from the oil pump 288. From there, it flows through the port 290 and into the second lube chamber 289. The check valve assembly 34 helps to control for oil between these two chambers. From there, the oil flows through the oil cooler 31. From the oil cooler 31, the oil flows into the cooled lube inlet chamber 294. From there, the oil flows into the base housing 30 and into the filter cartridge assembly 5.

FIG. 16 also illustrates the flow path of the coolant, shown at reference numeral 334. Coolant enters the port assembly at coolant inlet tube 32 and flows into the coolant chamber 298. From there, it flows into the oil cooler 31. From the oil cooler 31, the coolant flows into the second coolant chamber 299. From there the coolant is conveyed from the port assembly 284 through the coolant outlet tube 32'.

During engine operation, liquid flow will cause the anti-drain valve 34 to open allowing liquid to flow into the first lube chamber 287. When the engine is shut down, the anti-drain valve 34 closes, thereby preventing the liquid from draining out of the base housing 30 and back through the pump 288 (FIG. 2).

Figure 18:
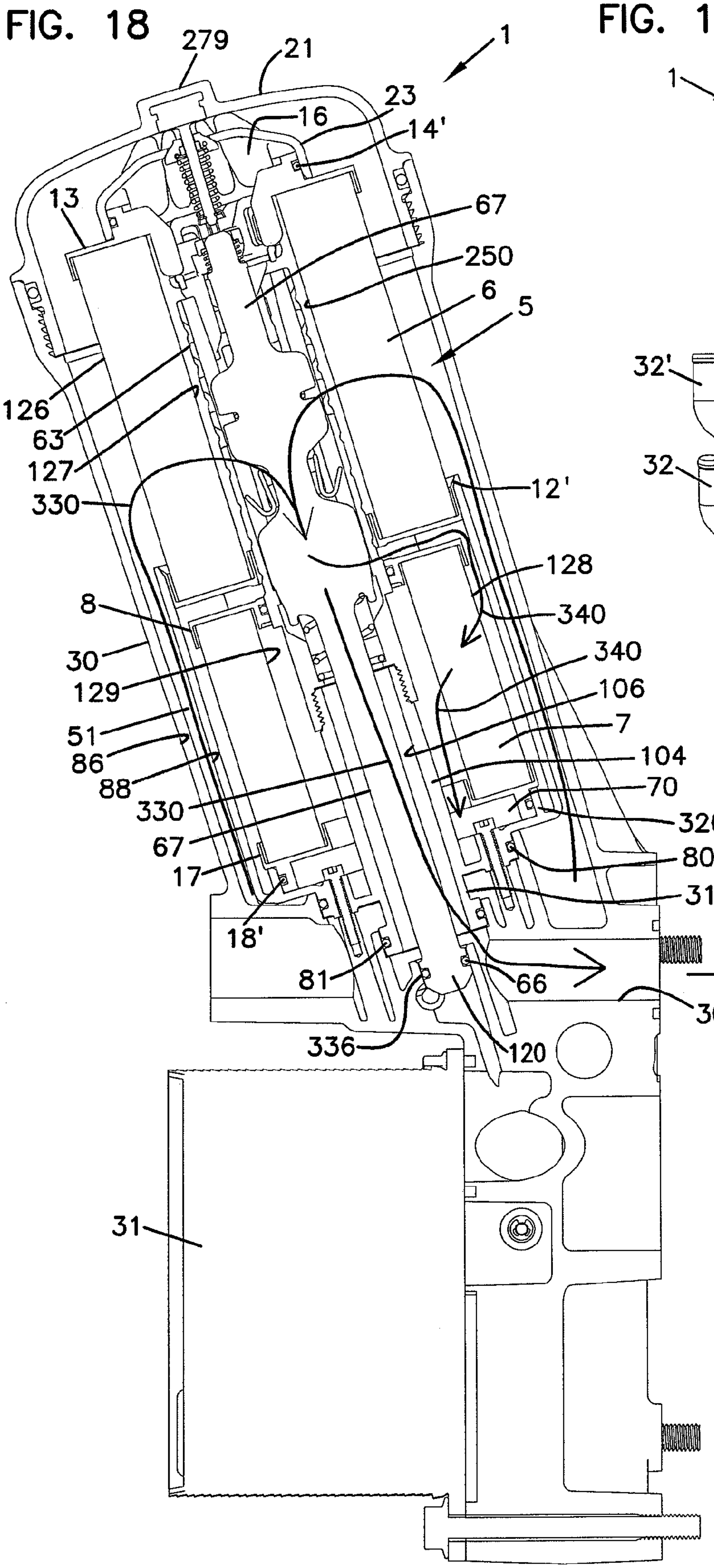
FIG. 18 is a cross-sectional view of the filter assembly of FIG. 4 and showing flow paths therethrough, the cross-section being taken along the line 18-18 of FIG. 19.
Figure 19:
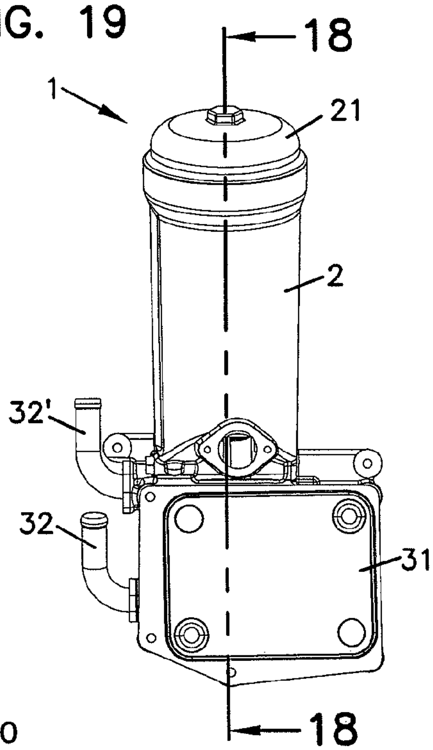
FIG. 19 is a side-elevational view of the filter assembly of FIG. 4.
Figure 21:
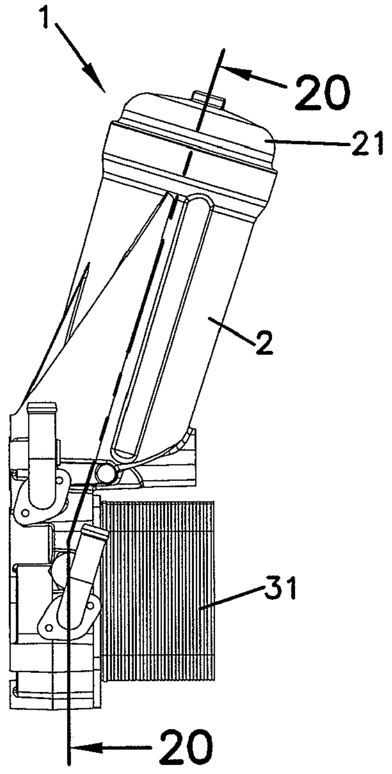
FIG. 21 is a side-elevational view of the filter assembly of FIG. 4.

Attention is next directed to FIG. 18. FIG. 18 shows the liquid (such as oil) flow through the filter assembly 1. For purposes of example, the liquid is referred to in this example as oil. The flow path of the oil is shown at arrow 330. Dirty oil flows up through the annulus 86 created by the inside diameter of the base housing 30 and the outside diameter of the insert 51. Oil enters the first media pack 6 at an upstream side 126, passes through media pack 6 (which removes particulate and other debris from the oil) to emerge from a downstream side 127, and flows into the first open interior volume 250. From there, it flows through the inner liner 63, down along the axis of post 67 within volume 106, around the lower drain valve 336 at the end of the post 67, and then out through the outlet port 300 to be conveyed to engine components 214.

A portion of the oil, shown at arrow 340, after passing through the first media pack 6, is then directed through a passage axially between the first media pack 6 and second media pack 7. In the embodiment shown, the portion of the oil flows through the flow passage 9 (FIG. 7) of the center endcap 8. After flowing through the passage 9, the oil flows into the annulus 88 between the inside diameter of the insert 51 and outside diameter of second media pack 7. The oil then passes from the upstream side 128 of the media pack 7, through the media pack 7 (which removes particulate and other debris), and emerges from the downstream side 129 of the media pack 7, and into a chamber 70 at the bottom of the insert 51. The chamber 70 is within the wall 320 of the insert 51.

The lip seal 12' on the center endcap 8 prevents oil on the dirty side (upstream side 126) of the first media pack 6 from entering into the dirty side (upstream side 128) of the second media pack 7. Seal member 18' prevents oil on the dirty side 128 of the second media pack 7 from bypassing the second media pack 7.

Figure 20:
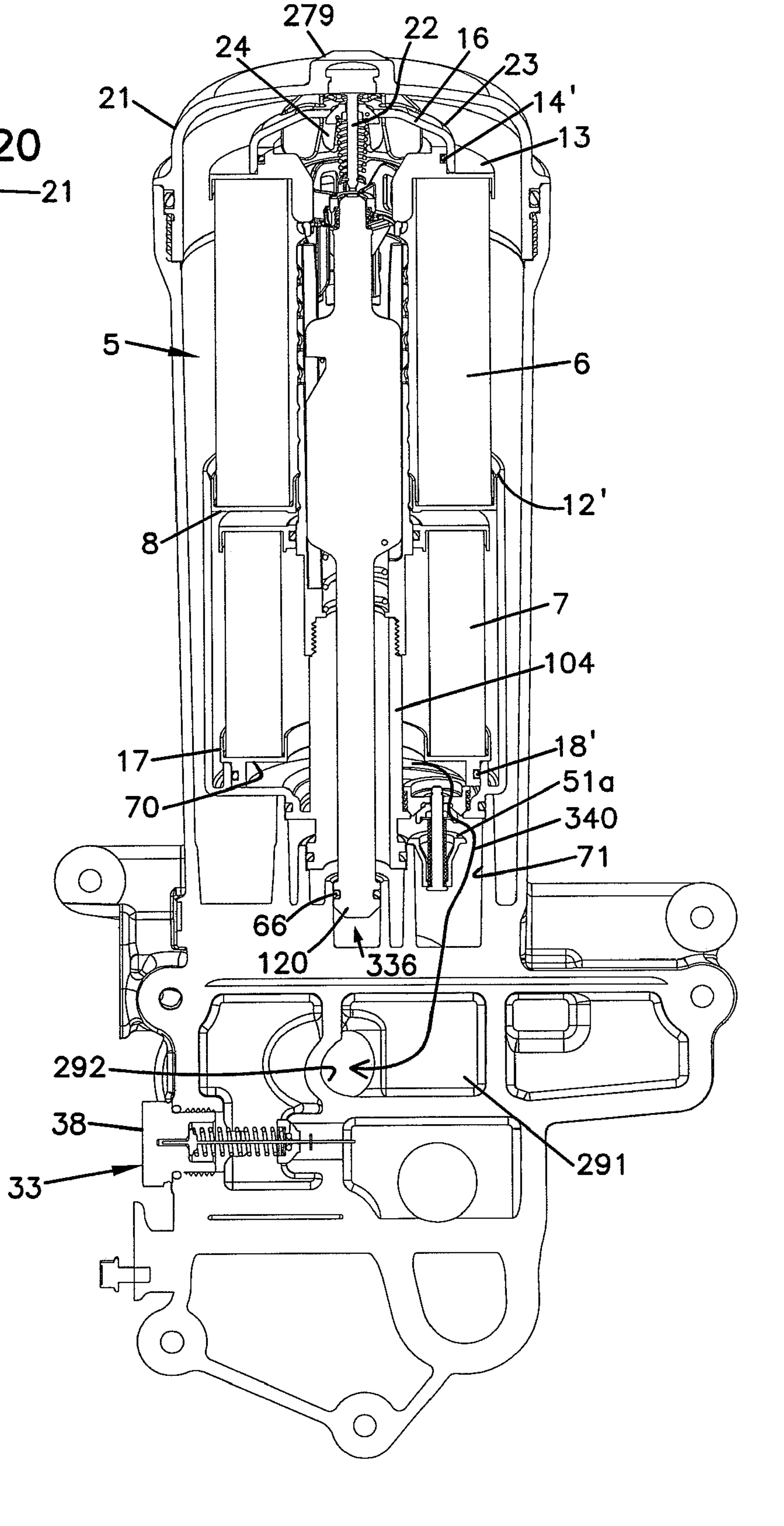
FIG. 20 is a cross-sectional view of the filter assembly of FIG. 4 and showing flow paths therethrough, the cross-section being taken along the line 20-20 of FIG. 21.
Figure 23:
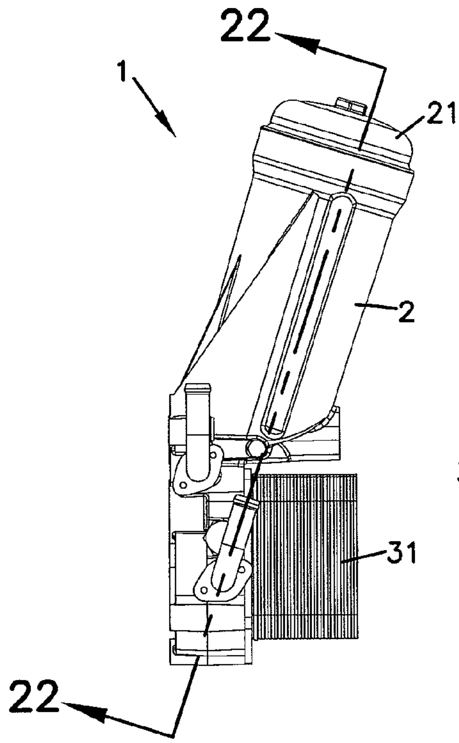
FIG. 23 is a side-elevational view of the filter assembly of FIG. 4.

FIG. 20 shows further flow of the oil directed through the second media pack 7. Again, this flow path is shown at arrow 340. The oil flows from chamber 70, across the combination valve 51*a*, into chamber 71, continuing to lube sump chamber 291 and then through port 292, which directs the oil to engine oil sump 216. During this operation, the combination valve 51*a* acts as an orifice restricting enough flow through the second media pack 7 to ensure that the majority of the liquid, such as oil, will flow through the first media pack 6 and into the filtered liquid port 300 and to 214 engine components providing proper lubrication. In many embodiments, at least 80% will flow through the first media pack 6, while no greater than 20% will flow through the second media pack 7. In preferred embodiments, about 90% or more of the liquid will flow through the first media pack 6, while no greater than 10% of the liquid will flow through the second media pack 7.

When the engine is shut down, the combination valve 51*a* will be closed preventing oil inside of the housing insert 51 from draining back to the sump 216 (FIG. 2). The above operation occurs when the filter cartridge assembly 5 is operably-installed in the base housing 30. When the filter cartridge assembly 5 is removed, the combination valve 51*a* opens, allowing oil in the housing insert 51 to drain back to the sump 216.

Attention is directed to FIG. 22. In FIG. 22, the drain valve 36 can be seen in cross-section. During engine operation, the drain valve 36 remains closed. The valve is actuated by removal of the cover 21. FIG. 12 shows an exploded perspective view of the drain valve 36. As can be seen by comparing FIGS. 12 and 22, the drain valve 36 includes an elongated valve member 90 with a plug 92 and a spring 37. The valve member 90 defines an end surface 94, which engages the rim 96 of the cover 21. The rim 96 of the cover 21 presses on the end surface 94, which provides a force through the valve member 90 against the spring 37. The plug 92 is pushed into engagement to fit within the drain hole 98. A seal member on the plug 92 provides a seal between the wall of the drain hole 98 and the plug 92. When the cover 21 is unthreaded from the base housing 30, the force between the rim 96 of the cover 21 and the valve member 90 is relieved. The spring 37 pushes the valve member 90 in a direction toward the cover 21, which removes the plug 92 from sealing engagement with drain hole 98. During servicing of the filter cartridge assembly 5, the valve 36 opens as the cover assembly 20 is unthreaded from the base housing 30. As the valve 36 opens, oil on the dirty side of the first media pack 6 is allowed to flow into chamber 71. Chamber 71 is in flow communication with the lube sump chamber 291 and the port 292 leading to the sump 216.

In FIG. 24, fluid (for example, liquid oil) is shown draining from the clean side (downstream side) of the first media pack 6 during servicing. In this figure, the filter cartridge assembly 5 is completely removed from the base housing 30. In practice, the filter cartridge assembly 5 only needs to move a short distance axially upwardly along the center line of the post 67 in order to activate by opening the valve 336 at the lower end of the post 67 to the open position. When the cartridge 5 is removed from the housing 30, the valve 336 is opened, by moving the plug 120 holding the seal member 66 away from the bore 121. In this embodiment, the plug 120 is moved from sealing engagement in the bore 121 because the spring 64 pushes against fins 122 of the post 67, which moves the post 67 and the plug 120 axially upwardly relative to the housing 30 including the bore 121. When the seal member 66 is no longer in sealing engagement with the bore 121, the filtered liquid drains through volume 106 to the lube sump chamber 291.

Attention is directed to FIG. 14. The various seals at the lower portion of the assembly are illustrated. The seal 320 separates the filtered liquid that has been filtered by both the first media pack 6 and second media pack 7 from the lube sump chamber 291 before the liquid goes through the combination valve 51*a*, and it drains back to the lube sump chamber 291. The seal 314 separates the dirty, unfiltered fluid that just entered the housing 30 from the lube sump chamber 291, before the fluid passes through the main filter, which is the first media pack 6. The seal 318 separates the fluid that has been filtered by the first media pack 6 and which has flowed through the volume 106 from entering the lube sump chamber 291 as the filtered fluid exits the assembly 1. The seal 66 separates the filtered fluid that is exiting the system from the volume 106 to the lube sump chamber 291.

Figure 26:
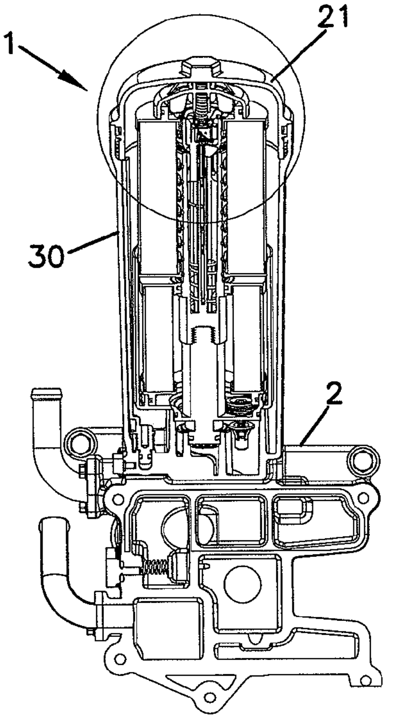
FIG. 26 is a cross-sectional view of the filter cartridge assembly of FIG. 4.
Figure 27:
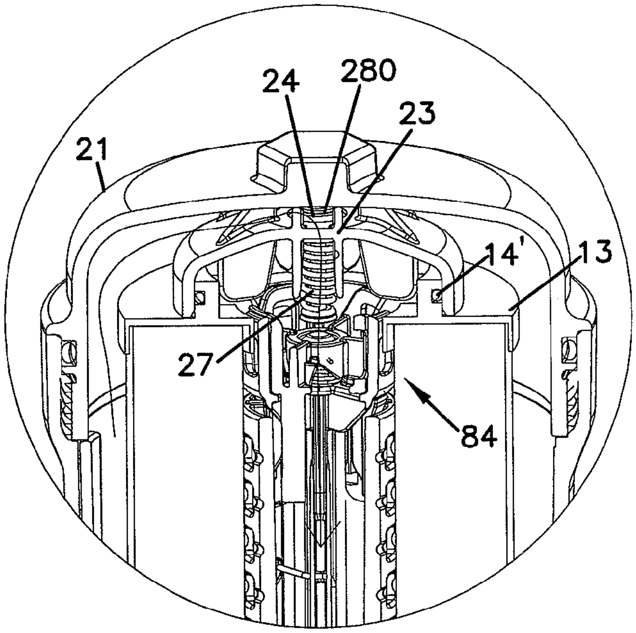
FIG. 27 is an enlarged, perspective, cross-sectional view of a portion of the filter cartridge assembly of FIG. 26.

In FIGS. 26-28, the bypass valve 280 is shown enlarged for further explanation. In addition, the lockout mechanism 84, as described above, is also illustrated in closer detail. If the pressure drop across the first media pack 6 exceeds the cracking pressure of the bypass valve 280, the poppet 24 opens allowing liquid to flow into the first open filter interior 250, which corresponds to the clean side of the first media pack 6.

The filter lockout mechanism 84 can also be seen in further detail. As the cover/cartridge assembly 3 is installed into the base housing 30, the key tab 16 on the first endcap 13 engages a portion of the basket 69, turning the legs 324 (FIG. 13) of the basket 69, allowing the basket 69 and post 67 to move axially downwardly against the compression spring 64 (FIG. 13). This action allows the threads 278 on the cover 21 to engage the threads on the base housing 30. If just the cover 4 is installed without the filter cartridge assembly 5, the basket 69 and post 67 will not move axially downwardly which prevents the threads 278 on the cover 4 from engaging the threads on the base housing 30.

Figure 29:
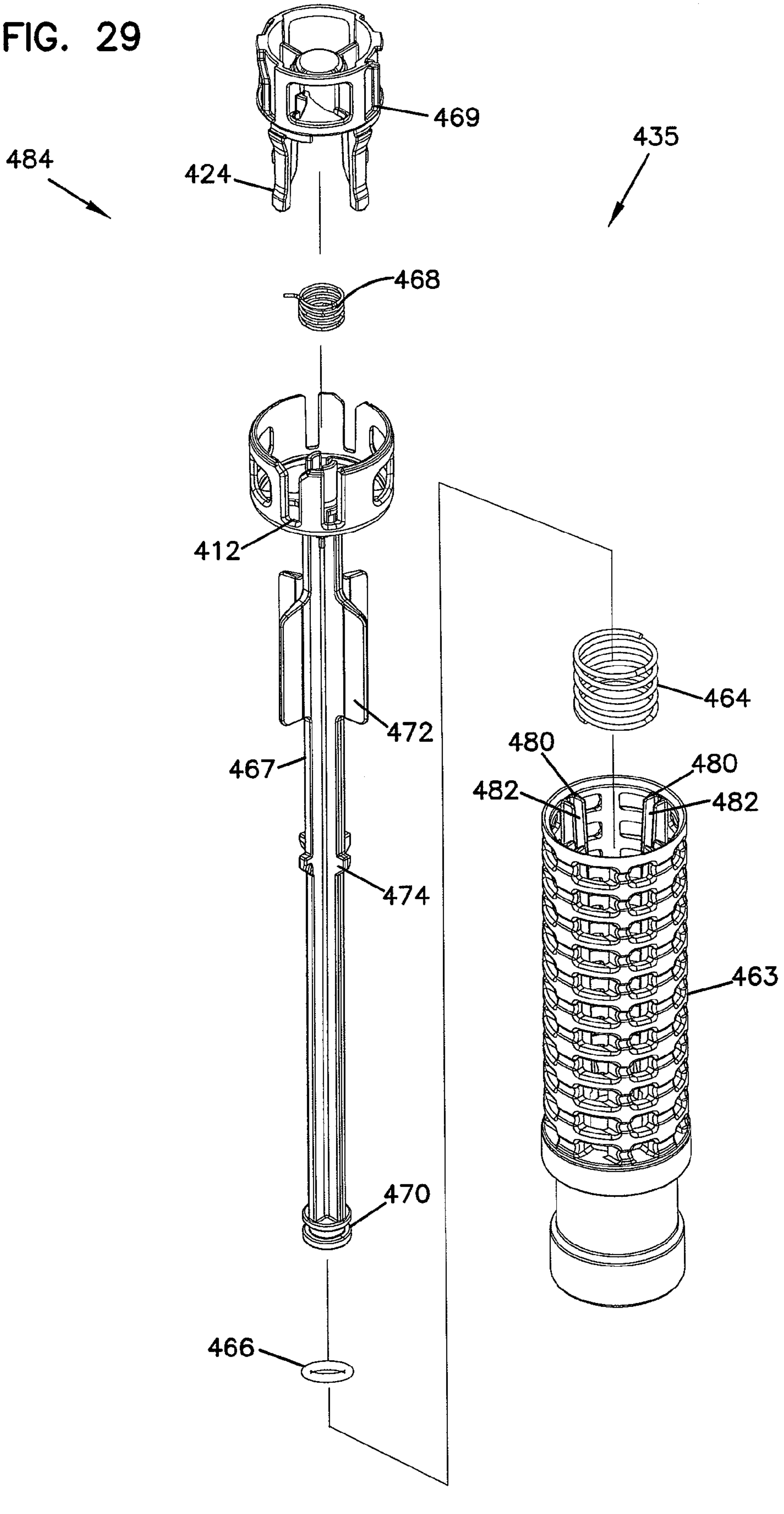
FIG. 29 is an exploded, perspective view of another embodiment of internal components for use in a filter assembly, constructed in accordance with principles of this disclosure.
Figure 30:
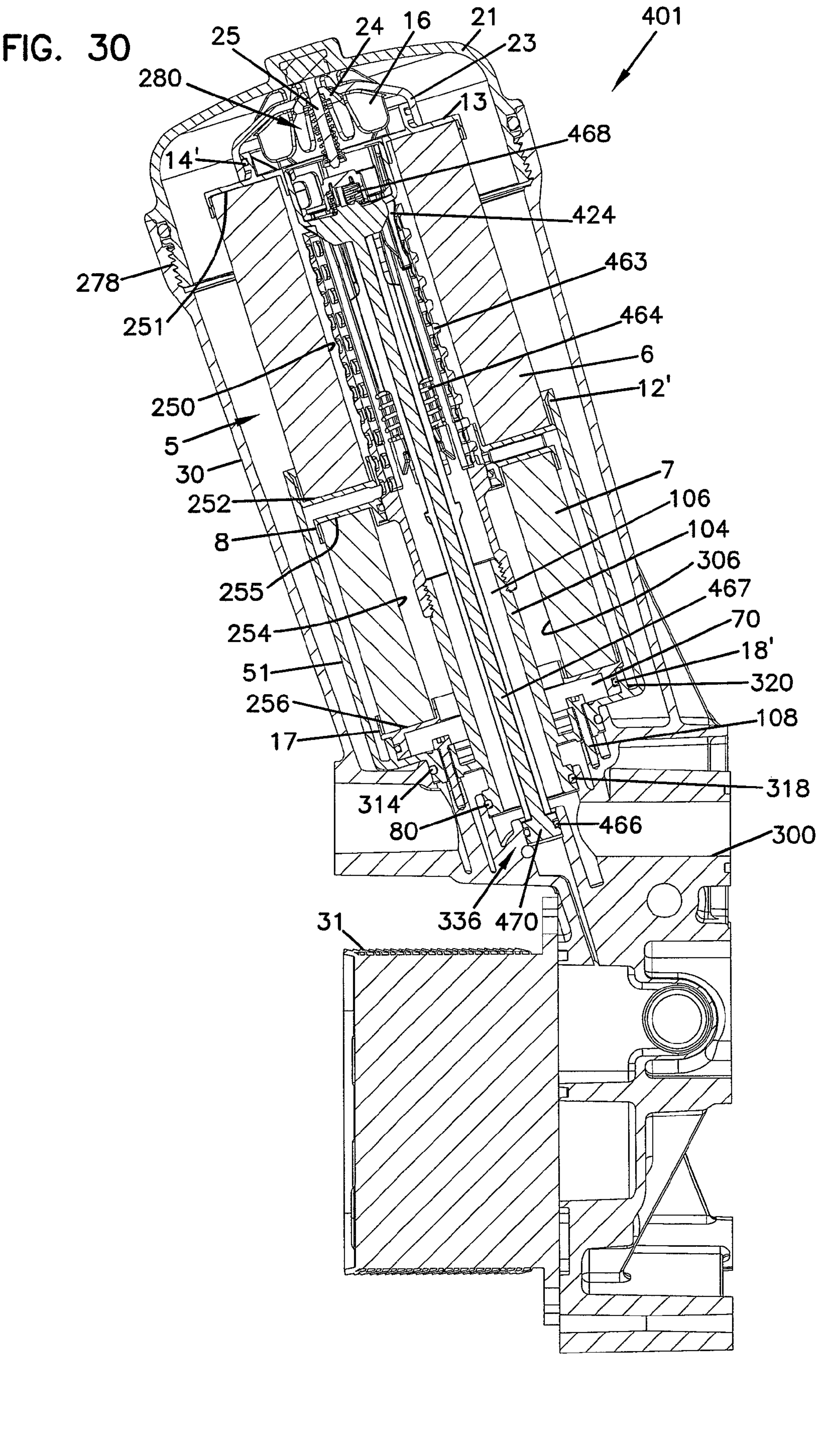
FIG. 30 is a cross-sectional view of a filter assembly utilizing the internal components of FIG. 29, the cross-section being analogous to the cross-section of FIG. 14.

FIG. 30 illustrates a second embodiment of the filter assembly 401. The only difference between the filter assembly 1 and filter assembly 401 is the inner liner assembly 435 (FIG. 29) of assembly 401 and the inner liner assembly 35 of assembly 1. Other than the inner liner assembly 435, the features of the filter assembly 401 are the same as filter assembly 1, and common reference numerals are used. The description of the features of assembly 401 is incorporated herein by reference from the description above.

The inner liner assembly 435 forms a filter lockout 484, which is described in commonly assigned and co-pending patent application WO 2008/134494 filed Aug. 15, 2007 and published Nov. 6, 2008, the disclosure of which is incorporated by reference herein in its entirety. In FIG. 29, there is a basket 469 having legs 424. The legs 424 are received within apertures 412 defined by the post 467. The end of the post 467 forms a plug 470, with a seal member 466. The plug 470 forms drain valve 336, as described above. A spring 464 is held between fins 472, radially projecting from the post 467, and projections 474 also radially projecting from the post 467. A spring 468 biases the basket 469 rotationally so that the basket 469 is in a locked position with each of the legs 424 in engagement with an engagement end 480 of guide rails 482 within the inner liner 463. When the lockout mechanism 484 is in the locked position, the basket 469 is in its locked position, and without the filter cartridge assembly 5 installed in the base housing 30, the top of the basket 469 will engage against portions of the cover 21, and the basket 469 and post 467 will not be moveable axially downwardly, which will prevent the threads 278 on the cover 21 to engage the threads on the base housing 30.

When the filter cartridge assembly 5 is properly positioned in the base housing 30, portions of the first endcap 13 come in contact with the basket 469. As the filter cartridge assembly 5 moves axially downwardly, the basket 469 rotates from its locked position to its unlocked position against the torsion spring 468. As the basket 469 rotates, the legs 424 also rotate, moving away from engagement against end 480 of guide rails 482 in the inner liner 463. When the legs 424 completely clear the guide rails 482, any additional movement of the cartridge assembly 5 in a downwardly axial direction also causes the basket 469 and post 467 to also move in that direction against the compression spring 464. The compression spring 464 biases the basket 469 and the post 467 in an extended position. Once the filter cartridge assembly 5 has been moved downwardly enough to unlock the post 467 and move the basket 469 from its locked position into its unlocked position, the cover 21 will be able to matably engage threads on the base housing 30 for secure attachment.

GENERAL PRINCIPLES AND EXAMPLES

In general, a filter cartridge is providing having a first media pack having a tubular shape defining a first open interior volume; the first media pack having a first end and a second end; a second media pack having a tubular shape defining a second open interior volume; the second media pack having first and second ends; an endcap between the first media pack and the second media pack; the endcap having a first side, an opposite second side, and a tubular wall defining a bore extending between the first and second sides; the first media pack second end being secured to the endcap first side; the second media pack first end being secured to the endcap second side; and the tubular wall defining a slot arrangement; the slot arrangement providing communication between the bore and a region outside of the endcap.

The filter cartridge may include a first endcap secured to the first media pack first end and defining an opening in communication with the first open interior volume; and a second endcap secured to the second media pack second end and defining an opening in communication with the second open interior volume.

The first endcap may include an axially extending wall circumscribing the first endcap opening; the wall holding an o-ring seal member; and the second endcap may include an axially extending wall circumscribing the second endcap opening; the second endcap wall holding an o-ring seal member.

The first endcap further can include at least one key tab projecting radially inwardly into the first endcap opening.

The at least one key tab may include at least 4 key tabs.

The center endcap may include a lip seal member radially projecting from a wall surrounding the center endcap first side.

The center endcap may include an o-ring seal member held by the tubular wall and lining the bore axially between the slot arrangement and the center endcap second side.

The slot arrangement can include at least one elongated through slot.

The first media pack and the second media pack can be cylindrical in shape; and the first media pack can have a larger diameter than the second media pack.

The first media pack may an axial length greater than an axial length of the second media pack.

The first media pack may have pleated media; the second media pack may have pleated media; and the first and second media packs can be co-axially aligned.

A filter assembly may include a base assembly including a base housing defining an interior; the filter cartridge being operably and removably mounted in the interior of the base housing; and a cover removably oriented on the base housing; the cover being selectively removable to allow access to the interior of the base housing and access to the removable filter cartridge.

A housing insert can be operably oriented in the interior of the base housing; the insert can include an insert surrounding wall defining an insert interior, an open mouth providing access to the insert interior, an insert bottom defining a first opening and a valve-receiving opening; and the filter cartridge may be operably installed in the housing insert such that the second media pack and the center endcap are located within the insert interior while the first media pack is located outside of the insert interior.

The center endcap may include a lip seal member radially projecting from a wall surrounding the center endcap first side; and the lip seal member can form a seal with the insert surrounding wall.

A combination valve may optionally be within the valve-receiving opening of the insert; the combination valve controlling the amount of fluid being allowed to flow through the second media pack and also preventing fluid to drain from the base housing when there is no flow of fluid through the filter assembly.

The base assembly further may include a port assembly in communication with the base housing.

The base assembly further may include a lube cooler assembly operably connected to the port assembly.

The port assembly may include a first lube chamber downstream from a lube pump; a second lube chamber downstream of the first lube chamber and upstream of and in communication with the lube cooler assembly; a cooled lube inlet chamber downstream of and in communication with the lube cooler assembly; the cooled lube inlet chamber being immediately upstream of the filter cartridge assembly; a lube sump chamber downstream of the filter cartridge assembly and upstream of the lube sump; a first coolant chamber upstream of the lube cooler and in communication with the lube cooler; and a second coolant chamber downstream of the lube cooler and in communication with the lube cooler.

An anti-drain valve assembly may be operably oriented within the port assembly and controlling the flow of lube between the first lube chamber and the second lube chamber; and a lube cooler bypass valve assembly may be oriented to control the flow of lube between the first lube chamber and the cooled lube inlet chamber.

A filter lock-out mechanism may optionally be provided to ensure that the base housing and cover are not connectable unless the filter cartridge assembly is operably installed therein.

A drain mechanism may be provided to drain the base housing of liquid before the filter cartridge assembly is removed from the base housing.

A method of filter is provided which may include directing a first stream of liquid through a first filter media pack to remove particulate from the first stream; after removing particulate from the first stream by the first filter media pack, directing at least 80% of the volume of the first stream through a filtered liquid port to downstream components and directing the remaining no more than 20% of the volume through a second filter media pack to remove particulate and provide a second stream; the second media pack being part of a same cartridge as the first media pack; and after removing particulate from the remaining no more than 20% through the second filter media pack, directing the second stream to a liquid sump.

The method may include directing at least 90% of the volume of the first stream through a filtered liquid port to downstream components and directing the remaining no more than 10% of the volume through a second filter media pack to remove particulate and provide a second stream.

The method may include directing the no more than 20% of the volume through a flow passage in an endcap joining the first filter media pack and the second filter media pack.

The method may include controlling flow of the second stream with a combination valve between a clean side volume of the second filter media pack and a sump chamber.

The method may include directing the first stream radially through a first tubular pleated media pack, from outside the first pleated media pack to inside the first pleated media pack; and directing the no more than 20% of the volume from the inside of the first pleated media pack, through a flow passage axially between the first filter media pack and the second filter media pack, to a volume outside of the second filter media pack and then directing it through a second tubular pleated media pack, from outside the second pleated media pack to inside the second pleated media pack.

The method may include directing the no more than 20% of the volume to a volume between an inside of a filter insert wall and the outside of the second filter media pack.

A method of servicing a filter assembly can include providing a filter assembly; removing the cover from the base housing; removing the filter cartridge from the base housing; operably installing a new filter cartridge according to any one of claims 1-11 in the base housing; and putting the cover onto the base housing. The step of removing the cover may include opening a drain valve to drain liquid on an upstream side of the first media pack into a sump chamber.

The step of removing the filter cartridge may include opening a drain valve to drain liquid on a downstream side of the first media pack into a sump chamber.

The step of operably installing a new filter cartridge may include unlocking a filter lockout mechanism.

The above are examples and principles. Many embodiments can be made in accordance with the principles and examples provided. Not all the features described herein must be incorporated in an arrangement for the arrangement to have some selected advantage, according to the present disclosure.

What is claimed is:

1. A filter cartridge for installation in a base assembly with a housing insert therein; the filter cartridge for filtering a stream of liquid; the filter cartridge comprising:

(a) a first media pack having a tubular shape defining a first open interior volume;

(i) the first media pack having a first end and a second end;

(ii) the first media pack oriented to filter a first stream of liquid as the first stream flows through the first media pack and into the first open interior, when the filter cartridge is operably installed in the base assembly;

(b) a second media pack of a higher efficiency than the first media pack; the second media pack having a tubular shape defining a second open interior volume;

(i) the second media pack having first and second ends;

(c) a center endcap between the first media pack and the second media pack; the center endcap having a first side, an opposite second side, and a tubular wall defining a bore extending between the first and second sides;

(i) the first media pack second end being secured to the center endcap first side;

(ii) the second media pack first end being secured to the center endcap second side;

(iii) the tubular wall defining a slot arrangement; the slot arrangement being a flow passage between the bore and a region outside of the center endcap;

(iv) the slot arrangement dividing the first stream of liquid from the first media pack as the first stream flows from the first open interior and into the bore of the center endcap; the slot arrangement dividing the first stream so that only a portion of the first stream flows through the slot arrangement to the region outside of the center endcap and through the second media pack;

(d) a seal member surrounding the center endcap oriented to form a seal with a housing insert in a base assembly, when the filter cartridge is operably installed in the base assembly; the seal preventing the first stream of liquid from flowing through the second media pack until it has flown through the first media pack.

2. A filter cartridge according to claim 1 further comprising:

(a) a first endcap secured to the first media pack first end and defining an opening in communication with the first open interior volume;

(i) the first endcap includes an axially extending wall circumscribing the first endcap opening; the wall holding an o-ring seal member;

(b) a second endcap secured to the second media pack second end and defining an opening in communication with the second open interior volume; and (i) the second endcap includes an axially extending wall circumscribing the second endcap opening; the second endcap wall holding an o-ring seal member.

3. A filter cartridge according to claim 2 wherein:

(a) the first endcap further includes at least one key tab projecting radially inwardly into the first endcap opening;

(b) the seal member surrounding the center endcap includes a lip seal member radially projecting from a wall surrounding the center endcap first side; and (c) the center endcap includes an o-ring seal member held by the tubular wall and lining the bore axially between the slot arrangement and the center endcap second side.

4. A filter cartridge according to claim 1 wherein:

(a) the slot arrangement comprises at least one elongated through slot;

(b) the first media pack and the second media pack are cylindrical in shape; and (c) the first media pack has a larger diameter than the second media pack.

5. A filter cartridge according to claim 1 wherein:

(a) the first media pack has an axial length greater than an axial length of the second media pack;

(b) the first media pack comprises pleated media;

(c) the second media pack comprises pleated media; and (d) the first and second media packs are co-axially aligned.

6. A filter assembly comprising the filter cartridge according to claim 1 and:

(a) a base assembly including a base housing defining an interior; the filter cartridge being operably and removably mounted in the interior of the base housing; and (i) the base assembly including a port assembly in communication with the base housing;

(ii) the base assembly including a lube cooler assembly operably connected to the port assembly;

(b) a cover removably oriented on the base housing; the cover being selectively removable to allow access to the interior of the base housing and access to the removable filter cartridge.

7. A filter assembly according to claim 6 further comprising:

(a) a housing insert operably oriented in the interior of the base housing; the insert including an insert surrounding wall defining an insert interior, an open mouth providing access to the insert interior, an insert bottom defining a first opening and a valve-receiving opening; and (i) wherein the filter cartridge is operably installed in the housing insert such that the second media pack and the center endcap are located within the insert interior while the first media pack is located outside of the insert interior;

(b) the seal member on the center endcap includes a lip seal member radially projecting from a wall surrounding the center endcap first side; and (i) the lip seal member forms a seal with the insert surrounding wall; and (c) a combination valve within the valve-receiving opening of the insert;

(i) the combination valve controlling the amount of fluid being allowed to flow through the second media pack and also preventing fluid to drain from the base housing when there is no flow of fluid through the filter assembly.

8. A filter assembly according to claim 6 wherein:

(a) the port assembly includes:

(i) a first lube chamber downstream from a lube pump;

(ii) a second lube chamber downstream of the first lube chamber and upstream of and in communication with the lube cooler assembly;

(iii) a cooled lube inlet chamber downstream of and in communication with the lube cooler assembly;

(A) the cooled lube inlet chamber being immediately upstream of the filter cartridge assembly;

(iv) a lube sump chamber downstream of the filter cartridge assembly and upstream of the lube sump;

(v) a first coolant chamber upstream of the lube cooler and in communication with the lube cooler; and (vi) a second coolant chamber downstream of the lube cooler and in communication with the lube cooler.

9. A filter assembly according to claim 8 further including:

(a) an anti-drain valve assembly operably oriented within the port assembly and controlling the flow of lube between the first lube chamber and the second lube chamber; and (b) a lube cooler bypass valve assembly controlling the flow of lube between the first lube chamber and the cooled lube inlet chamber.

10. A filter assembly according to claim 7 further comprising:

(a) a filter lock-out mechanism to ensure that the base housing and cover are not connectable unless the filter cartridge assembly is operably installed therein; and (b) a drain mechanism to drain the base housing of liquid before the filter cartridge assembly is removed from the base housing.

11. A method of filtering liquid comprising:

(a) directing a first stream of liquid through a first filter media pack to remove particulate from the first stream by directing the first stream radially through a first tubular media pack, from outside the first media pack to inside the first media pack;

(b) after removing particulate from the first stream by the first filter media pack, directing at least 80% of the volume of the first stream through a filtered liquid port to downstream components and directing a second stream comprising the remaining no more than 20% of the volume from the inside of the first media pack, through a flow passage axially between the first filter media pack and a second tubular media pack, to a volume outside of the second tubular media pack and then directing it through the second tubular media pack, from outside the second tubular media pack to inside the second tubular media pack;

(i) the second media pack being part of a same cartridge as the first media pack; and (c) after removing particulate from the remaining no more than 20% through the second filter media pack, directing the second stream to a liquid sump.

12. A method according to claim 11 wherein:

(a) the step of directing at least 80% of the volume of the first stream through a filtered liquid port to downstream components and directing the remaining no more than 20% of the volume through a second filter media pack to remove particulate and provide a second stream, includes:

(i) directing at least 90% of the volume of the first stream through a filtered liquid port to downstream components and directing the remaining no more than 10% of the volume through a second filter media pack to remove particulate and provide a second stream; and (b) wherein the step of directing the remaining no more than 20% of the volume through a second filter media pack to remove particulate and provide a second stream, includes:

(i) directing the no more than 20% of the volume through a flow passage in an endcap joining the first filter media pack and the second filter media pack.

13. A method according to claim 11 wherein:

(a) the step of directing the second stream to a liquid sump includes:

(i) controlling flow of the second stream with a combination valve between a clean side volume of the second filter media pack and a sump chamber; and (b) the step of directing the no more than 20% of the volume from the inside of the first pleated media pack, through a flow passage axially between the first filter media pack and the second filter media pack, to a volume outside of the second filter media pack, includes:

(i) directing the no more than 20% of the volume to a volume between an inside of a filter insert wall and the outside of the second filter media pack.

14. A method of servicing a filter assembly; the method comprising:

(a) providing a filter assembly including:

(i) a base assembly including a base housing defining an interior; a filter cartridge being operably and removably mounted in the interior of the base housing; the base assembly including a port assembly in communication with the base housing; the base assembly including a lube cooler assembly operably connected to the port assembly;

(ii) a cover removably oriented on the base housing; the cover being selectively removable to allow access to the interior of the base housing and access to the removable filter cartridge;

(b) removing the cover from the base housing;

(c) removing the filter cartridge from the base housing;

(d) operably installing a new filter cartridge in the base housing; the new filter cartridge comprising:

(i) a first media pack having a tubular shape defining a first open interior volume; the first media pack having a first end and a second end; the first media pack oriented to filter a first stream of liquid as the first stream flows through the first media pack and into the first open interior, when the filter cartridge is operably installed in the base assembly;

(ii) a second media pack of a higher efficiency than the first media pack; the second media pack having a tubular shape defining a second open interior volume; the second media pack having first and second ends;

(iii) a center endcap between the first media pack and the second media pack; the center endcap having a first side, an opposite second side, and a tubular wall defining a bore extending between the first and second sides; the first media pack second end being secured to the center endcap first side; the second media pack first end being secured to the center endcap second side; the tubular wall defining a slot arrangement; the slot arrangement being a flow passage between the bore and a region outside of the center endcap; the slot arrangement dividing the first stream of liquid from the first media pack as the first stream flows from the first open interior and into the bore of the center endcap; the slot arrangement dividing the first stream so that only a portion of the first stream flows through the slot arrangement to the region outside of the center endcap and through the second media pack;

(iv) a seal member surrounding the center endcap oriented to form a seal with a housing insert in a base assembly, when the filter cartridge is operably installed in the base assembly; the seal preventing the first stream of liquid from flowing through the second media pack until it has flown through the first media pack; and (e) putting the cover onto the base housing.

15. A method according to claim 14 wherein:

(a) the step of removing the cover includes opening a drain valve to drain liquid on an upstream side of the first media pack into a sump chamber; and (b) the step of removing the filter cartridge includes opening a drain valve to drain liquid on a downstream side of the first media pack into a sump chamber.

* * * * *